United States Patent
Hong et al.

(10) Patent No.: US 10,879,747 B2
(45) Date of Patent: Dec. 29, 2020

(54) APPARATUS FOR TRANSMITTING WIRELESS POWER AND METHOD OF TRANSMITTING WIRELESS POWER ACCORDING TO POSITION TYPE

(71) Applicant: Samsung Electronics Co., Ltd., Gyeonggi-do (KR)

(72) Inventors: Jong-Chul Hong, Gyeonggi-do (KR); Kwang-Seob Kim, Gyeonggi-do (KR); Dong-Zo Kim, Yongin-si (KR); Ji-Won Kim, Gyeonggi-do (KR); Keum-Su Song, Seoul (KR); Min-Cheol Ha, Gyeonggi-do (KR); Se-Hyun Cho, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 341 days.

(21) Appl. No.: 15/928,210

(22) Filed: Mar. 22, 2018

(65) Prior Publication Data
US 2018/0278099 A1    Sep. 27, 2018

(30) Foreign Application Priority Data

Mar. 24, 2017 (KR) .......................... 10-2017-0037901

(51) Int. Cl.
*H02J 50/90* (2016.01)
*H01F 38/14* (2006.01)
(Continued)

(52) U.S. Cl.
CPC .............. *H02J 50/90* (2016.02); *H01F 38/14* (2013.01); *H02J 7/0042* (2013.01); *H02J 7/025* (2013.01);
(Continued)

(58) Field of Classification Search
CPC .. H02J 50/90; H02J 50/80; H02J 50/40; H02J 7/0042; H02J 50/12; H02J 7/025;
(Continued)

(56) References Cited

U.S. PATENT DOCUMENTS 4,211,963 A * 7/1980 Muller .................. H02K 29/08
310/268
8,335,556 B2 * 12/2012 Uchiyama .............. A61B 5/062
600/424
(Continued)

FOREIGN PATENT DOCUMENTS

EP         3 142 223 A2    3/2017
KR   10-2013-0102218 A    9/2013
(Continued)

OTHER PUBLICATIONS

European Search Report dated Aug. 16, 2019.
International Search Report dated Jun. 28, 2018.

*Primary Examiner* — M Baye Diao
(74) *Attorney, Agent, or Firm* — Cha & Reiter, LLC.

(57) ABSTRACT

Disclosed is an apparatus for transmitting wireless power including: a plurality of coils; a position-sensing circuit that determines a position of an electronic device charged by the apparatus; and a control circuit determines at least one coil corresponding to the determined position of the electronic device from among the plurality of coils and transmit wireless charging power through one coil selected from the at least one determined coil. Other embodiments can be applied.

20 Claims, 22 Drawing Sheets

(51) Int. Cl.
*H02J 50/12* (2016.01)
*H02J 7/02* (2016.01)
*H02J 50/80* (2016.01)
*H02J 50/40* (2016.01)
*H02J 7/00* (2006.01)
*H04B 5/00* (2006.01)

(52) U.S. Cl.
CPC .............. *H02J 50/12* (2016.02); *H02J 50/40* (2016.02); *H02J 50/80* (2016.02); *H04B 5/0037* (2013.01); *H04B 5/0075* (2013.01)

(58) Field of Classification Search
CPC ......... H02J 50/10; H02J 7/0044; H01F 38/14; H04B 5/0075; H04B 5/0037; H04M 1/04
USPC ........................................................ 320/108
See application file for complete search history.

(56) References Cited

U.S. PATENT DOCUMENTS

| | | | | |
|---|---|---|---|---|
| 8,723,842 B2* | 5/2014 | Kaneda | ............... | G06F 3/03545 345/179 |
| 9,231,411 B2* | 1/2016 | Baarman | ................ | H02J 50/12 |
| 9,410,823 B2* | 8/2016 | Widmer | ................ | B60L 3/003 |
| 9,472,338 B2* | 10/2016 | Keeling | ................ | H02J 5/005 |
| 9,502,922 B2* | 11/2016 | Hasegawa | ............ | H02J 50/60 |
| 10,145,908 B2* | 12/2018 | David | ................ | G01R 33/093 |
| 10,312,750 B2* | 6/2019 | Boer | ....................... | H02J 50/10 |
| 10,741,905 B2* | 8/2020 | Kim | ....................... | H01Q 1/243 |
| 2009/0033280 A1 | 2/2009 | Choi et al. | | |
| 2012/0326659 A1* | 12/2012 | Shukuya | ................. | H02J 50/10 320/108 |
| 2013/0043734 A1 | 2/2013 | Stone et al. | | |
| 2013/0063873 A1 | 3/2013 | Wodrich et al. | | |
| 2013/0140906 A1 | 6/2013 | Tanabe | | |
| 2014/0070765 A1* | 3/2014 | Hasegawa | ............ | H02J 7/0042 320/108 |
| 2014/0285122 A1* | 9/2014 | Lu | ........................... | H02K 1/26 318/135 |
| 2015/0188318 A1* | 7/2015 | Chen | ...................... | H02J 7/0044 307/104 |
| 2015/0326053 A1 | 11/2015 | Amano et al. | | |
| 2016/0028245 A1* | 1/2016 | Von Novak | ............ | H02J 7/025 307/104 |
| 2016/0118808 A1* | 4/2016 | Van Wageningen | ........................ | H05B 6/1236 307/104 |
| 2016/0134154 A1* | 5/2016 | Baarman | ................. | H02J 50/12 320/108 |
| 2018/0287434 A1* | 10/2018 | Ii | .............................. | B60L 53/38 |

FOREIGN PATENT DOCUMENTS

| | | |
|---|---|---|
| KR | 10-2013-0106707 A | 9/2013 |
| KR | 10-1618643 B1 | 5/2016 |

* cited by examiner

APPARATUS FOR TRANSMITTING WIRELESS POWER AND METHOD OF TRANSMITTING WIRELESS POWER ACCORDING TO POSITION TYPE

CLAIM OF PRIORITY

This application claims priority under 35 U.S.C. § 119(a) to Korean Patent Application Serial No. 10-2017-0037901, which was filed in the Korean Intellectual Property Office on Mar. 24, 2017, the entire content of which is hereby incorporated by reference.

TECHNICAL FIELD

The present disclosure relates to an apparatus for transmitting wireless power and a method of transmitting wireless power according to a position type.

BACKGROUND

An important feature of electronic devices such as smart phones is their portability. To allow portability, many electronic device use batteries. However, batteries may need to be recharged. Using a wired connection to device that charges the electronic device can entail using a chord that connects to the electronic device. Requiring the user to be connected the chord to their device can be inconvenient.

SUMMARY

According to the present disclosure, wireless charging includes an electromagnetic induction scheme using a coil, a resonance scheme using resonance, and a radio wave scheme (Radio Frequency (RF)/microwave radiation) for converting electrical energy to microwaves and then transmitting the microwaves.

The wireless charging can use an electromagnetic induction scheme or a resonant scheme with electronic devices such as smart phones. When a wireless Power-Transmitting Unit (PTU) (for example, a wireless charging pad) and a wireless Power-Receiving Unit (PRU) (for example, a smart phone or an electronic device) contact each other or are brought within a predetermined range of each other, a battery of the wireless PRU (for example, an electronic device) may be charged by a method such as electromagnetic induction or electromagnetic resonance between a transmission coil of the wireless PTU and a reception coil of the wireless PRU.

An electronic device (for example, a smart phone), which is positioned on a wireless power transmission device to be charged, may receive charging power from at least one conductive pattern among a plurality of conductive patterns (for example, coils) corresponding to the location at which the electronic device is positioned on the wireless power transmission device. In this case, when a user does not position the electronic device at a predetermined location on the wireless power transmission device, the electronic device may be charged by an unintended conductive pattern, and thus charging efficiency may decrease. Further, in order to select a high-efficiency conductive pattern, the wireless power transmission device may sequentially perform sensing operations for the electronic device in every conductive pattern, whereby the start of charging may be delayed.

Various embodiments of the present disclosure may provide a wireless power transmission device and a wireless power transmission method according to a position type which may increase wireless charging efficiency by determining at least one predetermined conductive pattern corresponding to the position of the electronic device positioned on the wireless power transmission device among a plurality of conductive patterns for transmitting charging power.

In accordance with an aspect of the present disclosure to solve the above problem or other problems, an apparatus for transmitting wireless power is provided. The apparatus includes: a plurality of coils; a position-sensing circuit that is configured to determines a position of an electronic device charged by the apparatus for transmitting wireless power; and a control circuit determines at least one coil corresponding to the determined position of the electronic device among the plurality of coils and transmit wireless charging power through one coil selected from the at least determined one coil.

In accordance with another aspect of the present disclosure, a method of transmitting wireless power by an apparatus for transmitting wireless power is provided. The method includes: determining a position of an electronic device charged by the apparatus; determining at least one coil corresponding to the determined position of the electronic device among the plurality of coils for charging the electronic device; and transmitting wireless charging power through one coil selected from the determined at least one coil.

A method of transmitting wireless power by an apparatus for transmitting wireless power according to various embodiments can increase the efficiency of wireless charging by performing charging after determining at least one conductive pattern corresponding to the position type of an electronic device positioned on the apparatus for transmitting wireless power among a plurality of conductive patterns (for example, coils) for transmitting charging power.

The apparatus for transmitting wireless power and the method of transmitting wireless power based on a position of the electronic device according to various embodiments may reduce the generation of unnecessary power for the remaining conductive patterns when power is supplied to at least one conductive pattern among the plurality of conductive patterns.

The apparatus for transmitting wireless power and the method of transmitting wireless power based on a position of the electronic device according to various embodiments can reduce signal (counter electromotive force) elements that impede the application and supply of power to the conductive pattern when power is applied to at least one conductive pattern among the plurality of conductive patterns.

The apparatus for transmitting wireless power and the method of transmitting wireless power based on a position of the electronic device according to various embodiments can rapidly start wireless charging by immediately selecting at least one conductive pattern.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
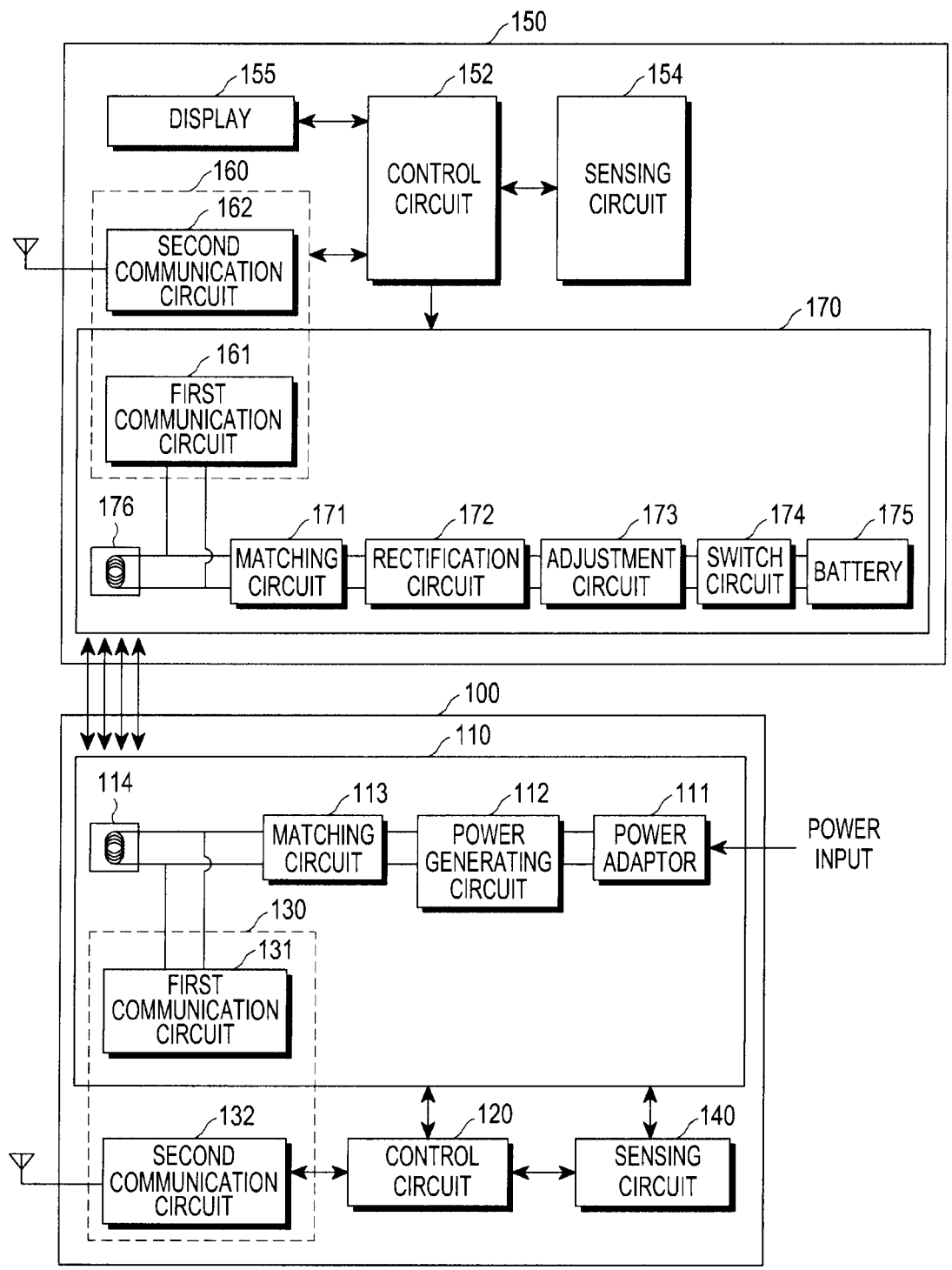
FIG. 1 is a block diagram illustrating a wireless power transmission device and an electronic device that receives wireless power according to various embodiments of the present disclosure.

Hereinafter, various embodiments of the present disclosure will be described with reference to the accompanying drawings. The embodiments and the terms used therein are not intended to limit the technology disclosed herein to specific forms, and should be understood to include various modifications, equivalents, and/or alternatives to the corresponding embodiments. In the description of the drawings, similar reference numerals may be used to designate similar elements. A singular expression may include a plural expression unless they are definitely different in a context. As used herein, singular forms may include plural forms as well unless the context clearly indicates otherwise. The expression "a first", "a second", "the first", or "the second" used in various embodiments of the present disclosure may modify various components regardless of the order and/or the importance but does not limit the corresponding components. When an element (e.g., first element) is referred to as being "(functionally or communicatively) connected," or "directly coupled" to another element (second element), the element may be connected directly to the another element or connected to the another element through yet another element (e.g., third element).

The expression "configured to" as used in various embodiments of the present disclosure may be interchangeably used with, for example, "suitable for", "having the capacity to", "designed to", "adapted to", "made to", or "capable of" in terms of hardware or software, according to circumstances. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., Central Processing Unit (CPU) or Application Processor (AP)) that can perform the corresponding operations by executing one or more software programs stored in a memory device.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit). In some embodiments, the electronic device may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

In other embodiments, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyrocompass), avionics, security devices, an automotive head unit, a robot for home or industry, an Automatic Teller's Machine (ATM) in banks, Point Of Sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.). According to some embodiments, an electronic device may include at least one of a part of furniture or a building/structure, an electronic board, an electronic signature receiving device, a projector, and various types of measuring instruments (e.g., a water meter, an electric meter, a gas meter, a radio wave meter, and the like). In various embodiments, the electronic device may be flexible, or may be a combination of one or more of the aforementioned various devices. The electronic device according to one embodiment of the present disclosure is not limited to the above described devices. In the present disclosure, the term "user" may indicate a person using an electronic device or a device (e.g., an artificial intelligence electronic device) using an electronic device. There is no limitation on the electronic device to which the present disclosure can be applied, as long as the electronic device can wirelessly transmit or receive wireless power according to various schemes.

Wireless charging can use wireless power transmission and reception, and corresponds to a system for charging a battery of an electronic device (for example, a mobile phone or a smart phone) without separate connection with a charging connector. Wireless charging may increase portability of the electronic device since it does not need a separate external device (for example, a Terminal Adapter (TA)) for charging the electronic device. Wireless charging can also allow for waterproofing of the electronic device since there is no connector for connection with an external device.

A wireless power transmission device may transmit power to a wireless power reception device (for example, an electronic device) through, for example, one or more of an inductive coupling scheme based on an electromagnetic induction phenomenon generated by a wireless power signal and an electromagnetic resonance coupling scheme based on an electromagnetic resonance phenomenon generated by a wireless power signal of a particular frequency.

A wireless power transmission method by electromagnetic induction is technology for wirelessly transmitting power through a primary conductive pattern (for example, a primary coil) and a secondary conductive pattern (for example, a secondary coil), in which current is induced from one conductive pattern to another conductive pattern by a variable magnetic field generated by the electromagnetic induction and thus power may be transmitted.

According to various embodiments of the present disclosure, the electronic device may generate electromagnetic resonance by a wireless power signal transmitted from the wireless power transmission device, and power may be transmitted from the wireless power transmission device to the electronic device by electromagnetic resonance.

According to various embodiments of the present disclosure, in power transmission by the wireless power transmission device, if the voltage or current flowing in a primary conductive pattern (for example, a primary coil) within the wireless power transmission device is changed, a magnetic field passing through the primary conductive pattern is changed by the current. The changed magnetic field generates an electromotive force in a secondary conductive pattern (for example, a secondary coil) within a wireless power reception device (for example, the electronic device). The electromotive force may be influenced by alignment and distance between the wireless power transmission device and the wireless power reception device including the conductive pattern.

In order to transmit wireless power, the wireless power transmission device may include an interface surface having a flat surface. One or more electronic devices may be positioned on the upper part of the interface surface, and a transmission conductive pattern may be installed on the lower part of the interface surface. Further, an alignment indicator for indicating the location at which the electronic device is positioned may be formed on the upper part of the interface surface. The alignment indicator may indicate the location of the electronic device for proper alignment between the transmission conductive pattern installed on the lower part of the interface surface and a reception conductive pattern. In some embodiments, the alignment indicator may be simple marks. In some embodiments, the alignment indicator may be formed in a protruded structure for guiding the positioning of the electronic device. Further, in some embodiments, the alignment indicator may be formed as a magnetic substance such as a magnet mounted to the lower part of the interface surface and may perform guidance such that the conductive patterns are properly aligned by mutually attractive force with an opposite pole of a magnetic substance mounted inside the electronic device.

According to various embodiments, the wireless power transmission device or the wireless power reception device (for example, the electronic device) may output feedback according to an alignment state in order to improve charging efficiency. The feedback may include a voice message, a predetermined sound effect, a vibration, a text message, and a video indicating an example for correcting alignment through a display.

According to various embodiments, the wireless power transmission device may include one or more transmission conductive patterns. The wireless power transmission device may increase power transmission efficiency by selectively using some conductive patterns properly aligned with the reception conductive pattern of the electronic device among the one or more transmission conductive patterns.

According to various embodiments, as described above, the term "conductive pattern (electrical conductive pattern)", "conductive member (electrical conductive member)", or "conductor (electrical conductor)" is used to include a material, an element, a member, a part, or a component having the conductive pattern, and may include any material, element, member, part, or component for wirelessly transmitting power to be charged or wirelessly receiving charging power, which corresponds to the broadest concept and is not limited to a particular material, a particular form, or a particular pattern. For example, according to various embodiments, the conductive pattern, the conductive member, or the conductor may be a material in a coil form, a material in a metal plate form, or various materials for transmitting or receiving wireless power, or may be configured in various forms or various patterns in a particular wireless power transmission method. In this document described below, the term "coil" is used as the conductive pattern, the conductive member, or the conductor to assist understanding, but the coil in the following description is not limited to a conductive pattern having a particular form and is used to include various materials, various forms, and various patterns for transmitting or receiving wireless power. Further, the coil may be replaced with the term "conductive pattern", "conductive member", or "conductor".

According to various embodiments, the wireless power transmission device may charge the electronic device after the electronic device (wireless power reception device) to be charged is positioned in various ways. For example, the wireless power transmission device is designed to be mechanically transformed and thus position the electronic device to be charged in various ways (for example, standing or lying flat). According to various embodiments, the wireless power transmission device may position the electronic device in various types by positioning the electronic device at different locations on the wireless power transmission device in the same mechanical form. In the following description, the mode corresponding to the position of the electronic device are standing, or lying flat. Standing can include a "horizontal orientation", or a "vertical orientation" for convenience of description, but the name of the position is only an example, and embodiments of the present disclosure are not limited as to the position or name of the position. According to various embodiments, as the form of the wireless power transmission device is variously changed and the position type of the electronic device positioned on the wireless power transmission device is diverse, the name referring to the mode may vary.

According to various embodiments, in this document, the term "mode" is used for convenience of description, and is not limited to a particular setting or status. For example, a "mode" can refer to the use of specific coils. Determining the mode corresponding to the position of the electronic device may include setting a predetermined value based on sensing information according to the position type.

According to various embodiments, when the electronic device is positioned on the wireless power transmission device, the wireless power transmission device may determine the position of the electronic device by, for example, a position-sensing circuit. For example, it may be determined whether the electronic device is positioned on the wireless power transmission device while standing or whether the electronic device is positioned on the wireless power transmission device while lying flat.

When the electronic device is standing, the mode of operation of the wireless power transmission device can be referred to as the stand mode. When the electronic device is lying flat, the mode of operation of the wireless power transmission device can be referred to as the pad mode.

According to various embodiments, when the electronic device is positioned on the wireless power transmission device, the wireless power transmission device may determine whether the electronic device is positioned on the wireless power transmission device in a horizontal orientation or whether the electronic device is positioned on the wireless power transmission device in a vertical orientation.

When the electronic device is standing in the horizontal orientation, the mode of operation of the wireless power transmission device can be referred to as the horizontal mode. When the electronic device is standing in the vertical orientation, the mode of operation of the wireless power transmission device can be referred to as the vertical mode.

According to various embodiments, the wireless power transmission device may determine the position of the electronic device and determine at least one coil corresponding to the determined position among a plurality of coils (conductive patterns) included in the wireless power transmission device. The wireless power transmission device may transmit wireless charging power to the electronic device through at least one coil selected from the determined at least one coil.

According to various embodiments, when the number of coils predetermined in accordance with the determined position of the electronic device is plural, the wireless power transmission device may sequentially transmit a signal for identifying the electronic device positioned on the wireless power transmission device to the plurality of coils. The wireless power transmission device may determine a coil that meets a predetermined condition (for example, a condition corresponding to a set impedance change attributable to a load) corresponding to the transmitted signal or receives a normal signal (for example, an advertisement signal) from the electronic device as a coil for charging the electronic device among the plurality of coils.

According to various embodiments, the coil may be a movable coil. When the location of the electronic device (wireless power reception device) is determined through a location detection unit, the wireless power transmission device may include a driving unit that moves the transmission coil such that a distance between the transmission coil and the center of the reception coil of the electronic device is within a predetermined range or rotates the transmission coil such that the transmission coil overlaps the center of the reception coil. The wireless power transmission device may further include a multiplexer that establishes and releases the connection of some of the one or more transmission coils. When the location of the wireless-power reception device positioned on the interface surface is sensed, the multiplexer may be controlled to connect coils which may have an inductive or a resonant-coupling connection with the reception coil of the wireless power reception device among the one or more transmission coils in consideration of the sensed location.

According to various embodiments, a power conversion unit of the wireless power transmission device may include one or more transmission coils and a resonance-forming circuit connected to each transmission coil. Further, the power conversion unit may further include a multiplexer that establishes and releases the connection with some of the one or more transmission coils. The one or more transmission coils may be configured to have the same resonant frequency or different resonant frequencies. According to various embodiments, some of the one or more transmission coils may be configured to have different resonant frequencies, which may be determined according to inductance and/or capacitance of the resonance-forming circuits connected to the respective one or more transmission coils.

FIG. 1 is a block diagram illustrating a wireless power transmission device and an electronic device that receives wireless power according to various embodiments of the present disclosure. Referring to FIG. 1, a wireless power transmission device 100 according to various embodiments of the present disclosure may include at least one of a power-transmitting circuit 110, a control circuit 120, a communication circuit 130, and a sensing circuit 140. A wireless power reception device (for example, an electronic device 150) that wirelessly receives power may include at least one of a power-receiving circuit 170, a control circuit 152, a communication circuit 160, a sensing circuit 154, and a display 155.

The power-transmitting circuit 110 according to various embodiments of the present disclosure may provide power to the electronic device 150. The power-transmitting circuit 110 may include a power adaptor 111, a power-generating circuit 112, a matching circuit 113, a conductive pattern 114 (for example, a coil), or a first communication circuit 131. The power-transmitting circuit 110 may be configured to wirelessly transmit power to the electronic device 150 through the conductive pattern 114. The power-transmitting circuit 110 may receive power in the form of Direct Current (DC) or an Alternating Current (AC) waveform externally and may supply the received power in the form of an AC waveform to the electronic device 150. The conductive pattern 114 may include a plurality of conductive patterns (for example, coils).

According to various embodiments, the control circuit 120 may determine at least one of the plurality of conductive patterns as a conductive pattern for charging according to the position of the electronic device on the wireless power transmission device 100. Various embodiments for determining the position of the electronic device 150 in order to select at least one conductive pattern in which the wireless power transmission device 100 transmits charged power to charge the electronic device 150 will be described in more detail.

The power adaptor 111 may receive AC or DC power externally or receive a power signal of an embedded battery device, and may output DC power having a preset voltage value. The voltage value of the DC power output from the power adaptor 111 may be controlled by the control circuit 120. The DC power output from the power adaptor 111 may be output to the power-generating circuit 112.

The power-generating circuit 112 may convert the DC power output from the power adaptor 111 into AC power and output the converted AC power. The power-generating circuit 112 may include a predetermined amplifier (not shown). When a DC voltage or current input through the power adaptor 111 is lower than a preset gain, the amplifier may amplify the DC voltage or the current to a preset value. The power-generating circuit 112 may include a circuit that converts the DC input from the power adaptor 111 into the AC based on a control signal input from the control circuit 120.

The power-generating circuit 112 according to various embodiments may include a bridge circuit including a plurality of switches. The conductive pattern 114 may include a plurality of conductive patterns, and the plurality of conductive patterns may share at least part of the power-generating circuit 112, which will be described below in detail. For example, the power-generating circuit 112 may convert the DC to AC through a predetermined inverter. The power-generating circuit 112 may include a gate-driving device (not shown). The gate-driving device may convert the DC to AC while controlling the on/off of the DC. Alternatively, the power-generating circuit 112 may generate an AC power signal through a wireless power generator (for example, an oscillator).

The matching circuit 113 may perform impedance matching. For example, when the AC signal output from the power-generating circuit 112 is transmitted to the conductive pattern 114, an electromagnetic field may be formed on the conductive pattern 114 by the AC signal. According to various embodiments of the present disclosure, the AC signal may be provided only to some of the plurality of conductive patterns, which will be described below in detail. The frequency band of the formed electromagnetic field signal may be adjusted by controlling the impedance of the matching circuit 113. The matching circuit 113 may control output power transmitted to the electronic device 150 through the conductive pattern 114 by the adjustment of impedance to be high-efficiency power or high-output power. The matching circuit 113 may adjust impedance under the control of the control circuit 120. The matching circuit 113 may include at least one of an inductor (for example, a conductive pattern or a coil), a capacitor, and a switching device. The control circuit 120 may control a connection state with at least one of the inductor and the capacitor through the switching device, and may perform impedance matching according to the connection state.

At least one of the control circuit 120 of the wireless power transmission device 100 and the control circuit 152 of the electronic device 150 may be implemented as various circuits, such as a general-purpose processor including a CPU, a mini computer, a microprocessor, a Micro Controlling Unit (MCU), and a Field-Programmable Gate Array (FPGA) that may perform calculations, and there is no limitation on the type thereof.

When the current is applied, the conductive pattern 114 may form a magnetic field for inducing or resonating the current to the electronic device 150 according to a wireless charging scheme. The first communication circuit 131 (for example, a resonance circuit) may perform communication (for example, data communication) in an in-band manner through an electromagnetic wave generated by the conductive pattern 114.

The sensing circuit 140 may sense a change in current/voltage applied to the conductive pattern 114 of the power-transmitting circuit 110. Although the sensing circuit 140 is illustrated as a circuit separated from the power-transmitting circuit 110 in FIG. 1, at least a part of the sensing circuit 140 may be included in the power-transmitting circuit 110. The wireless power transmission device 100 may adjust the amount of power to be transmitted according to the change in current/voltage applied to the conductive pattern 114. Alternatively, the sensing circuit 140 may sense a temperature change of the wireless power transmission device 100. According to various embodiments, the sensing circuit 140 may include at least one of a current/voltage sensor and a temperature sensor. According to various embodiments, a part of the sensing circuit 140, for example, the current/voltage sensor, may be included in the power-transmitting circuit 110, and another part, for example, the temperature sensor may be arranged outside the power-transmitting circuit 110.

According to various embodiments, when the electronic device 150 is positioned on the wireless power transmission device 100, the sensing circuit 140 may include a position-sensing circuit configured to determine a position of the electronic device 150. For example, the position-sensing circuit may sense whether the electronic device 150 is positioned on the wireless power transmission device 100 while standing or while lying flat and, when the electronic device 150 is positioned on the wireless power transmission device 100 while standing, may sense whether the electronic device 150 is oriented horizontally or vertically. The sensing circuit 140 can determine a position of the electronic device 150 (standing, lying flat, and if standing, in the horizontal orientation or the vertical orientation) and determine the mode of operation of the wireless power transmission device 100 based on the position of the electronic device 150 (for example, standing mode or pad mode, depending on whether the electronic device is standing or lying flat, and if the standing mode, the horizontal mode if the electronic device is in the horizontal orientation or vertical mode if electronic device is in the vertical orientation). The mode of operation can include selection of one or more conductive patterns for charging the electronic device 150.

According to various embodiments, a method of determining the position of the electronic device 150 by the position-sensing circuit (for example, a position determination method) may be variously implemented. For example, as the type (for example, the stand-mode type or the pad-mode type) of the wireless power transmission device 100 is changed, the position-sensing circuit may sense and determine the change in the position, or when the electronic device 150 is positioned on the wireless power transmission device 100, the position-sensing circuit may sense and determine the positioned of the electronic device 150. For example, the method of sensing the position type of the mode attributable to the position type by the position-sensing circuit may be determined when the electronic device 150 is positioned on the wireless power transmission device 100, or may be determined by sensing a type change of the wireless power transmission device 100 regardless of whether the electronic device 150 is positioned on the wireless power transmission device 100. Detailed embodiments thereof will be described below.

The control circuit 120 may perform control to wirelessly transmit power to the electronic device 150 through the power-transmitting circuit 110. The control circuit 120 may perform control to wirelessly transmit or receive information from the electronic device 150 through the communication circuit 130.

According to various embodiments, the received information may contain at least one piece of charging setting information related to the battery status of the electronic device 150, power amount control information related to control of the amount of power transmitted to the electronic device 150, environment information related to a charging environment of the electronic device 150, and time information of the electronic device 150.

The charging setting information may be information related to the battery status of the electronic device 150 at a wireless charging time point between the wireless power transmission device 100 and the electronic device 150. For example, the charging setting information may include at least one of a total battery capacity, a remaining battery charge, the number of times of charging, a used amount of battery, a charging mode, a charging scheme, and a wireless reception frequency band.

The power amount control information may be information for controlling the amount of initially transmitted power according to a change in the amount of power charged in the electronic device 150 during wireless charging between the wireless power transmission device 100 and the electronic device 150.

According to various embodiments, the power amount control information may be information that makes a request for changing the charging mode of the wireless power transmission device 100 according to the environment information and the charging setting information of the electronic device 150. For example, when the temperature measured through a sensing circuit of the electronic device 150 becomes higher than or equal to a particular value, the wireless power transmission device 100 may receive charging setting information to stop transmitting power or to lower the amount of transmitted power from the electronic device 150. According to various embodiments, when the wireless power transmission device 100 identifies the battery-charging status of the electronic device 150 and the battery is fully charged, the wireless power transmission device 100 may receive charging setting information to stop the charging of the electronic device 150 from the electronic device 150. According to various embodiments, the power amount control information may be charging setting information that makes a request for fast wireless charging.

The environment information is information on the charging environment of the electronic device 150 measured by the sensing circuit 154 of the electronic device 150, and may include, for example, at least one piece of temperature data including at least one of an internal temperature and an external temperature of the electronic device 150, illumination data indicating illumination (brightness) around the electronic device 150, and sound data indicating sound (noise) around the electronic device 150.

The control circuit 120 may generate or transmit power to be transmitted to the electronic device 150 based on the charging setting information among the received information. Alternatively, the control circuit 120 may determine or change the amount of power transmitted to the electronic device 150 based on at least some received information (for example, one of the power amount control information, the environment information, and the time information). Alternatively, the matching circuit 113 may be controlled to change impedance.

The communication circuit 130 may communicate with the electronic device 150 according to a predetermined scheme. The communication circuit 130 may perform data communication with the communication circuit 160 of the electronic device 150. For example, the communication circuit 130 may unicast, multicast, or broadcast the signal.

According to various embodiments, the communication circuit 130 may include at least one of a first communication circuit 131 that may be implemented as one piece of hardware with the power-transmitting circuit 110 and thus the wireless power transmission device 100 may communicate in an in-band type, and a second communication circuit 132 that may be implemented as (another piece of) hardware different from that of the power-transmitting circuit 110, and thus the wireless power transmission device 100 may communicate in an out-of-band type.

According to various embodiments, when the communication circuit 130 includes the first communication circuit 131 that communicates in the in-band type, the first communication circuit 131 may receive a frequency and a signal level of an electromagnetic field signal received through the conductive pattern 114 of the power-transmitting circuit 110.

The control circuit 120 may decode the received frequency and signal level of the electromagnetic field signal and extract information received from the electronic device 150.

According to various embodiments, the first communication circuit 131 may apply, to the conductive pattern 114 of the power-transmitting circuit 110, a signal for information of the wireless power transmission device 100 to be transmitted to the electronic device 150, or may add the signal for the information of the wireless power transmission device 100 to an electromagnetic field signal generated by the application of the signal output from the matching circuit 113 to the conductive pattern 114 and transmit the signal to the electronic device 150. The control circuit 120 may change a connection state with at least one of the inductor and the capacitor of the matching circuit 113 by controlling on/off of the switching device included in the matching circuit 113 and perform control to output the changed connection state.

According to various embodiments, when the communication circuit 130 includes the second communication circuit 132 that communicate in the out-of-band type, the second communication circuit 132 may communicate with the communication circuit 160 (for example, the second communication circuit 162) of the electronic device 150 through Near-Field Communication (NFC), ZigBee communication, infrared communication, visible ray communication, Bluetooth communication, or Bluetooth Low Energy (BLE) communication.

The communication schemes of the communication circuit 130 are only examples, and embodiments of the present disclosure do not limit the scope thereof to a particular communication scheme performed by the communication circuit 130.

According to various embodiments, the electronic device 150 may include the power-receiving circuit 170, the control circuit 152, the communication circuit 160, the sensing circuit 154, or the display 155. The power-receiving circuit 170 of the electronic device 150 may receive power from the power-transmitting circuit 110 of the wireless power transmission device 100. The power-receiving circuit 170 may be implemented in the form of an embedded battery, or may be implemented in the form of a power-receiving interface to receive power from the outside. The power-receiving circuit 170 may include a matching circuit 171, a rectification circuit 172, an adjustment circuit 173, a switch circuit 174, a battery 175, or at least one conductive pattern 176.

The power-receiving circuit 170 may receive, through the conductive pattern 176, wireless power in the form of an electromagnetic wave generated in accordance with current/voltage applied to the conductive pattern 114 of the power-transmitting circuit 110. For example, the power-receiving circuit 170 may receive power based on electromotive force formed on the conductive pattern 114 of the power-transmitting circuit 110 and the conductive pattern 176 of the power-receiving circuit 170.

The matching circuit 171 may perform impedance matching. For example, power transmitted through the conductive pattern 114 of the wireless power transmission device 100 may be transmitted to the conductive pattern 176, and thus an electromagnetic field may be formed. The matching circuit 171 may adjust the frequency band of the formed electromagnetic field signal by adjusting the impedance thereof. The matching circuit 171 may control input power received from the wireless power transmission device 100 through the conductive pattern 176 by the adjustment of the impedance to be high-efficiency power and high-output power. The matching circuit 171 may adjust impedance based on the control of the control circuit 152. The matching circuit 171 may include at least one of an inductor (for example, a conductive pattern or a coil), a capacitor, and a switching device. The control circuit 152 may control the connection state with at least one of the inductor and the capacitor through the switching device, and may perform impedance matching according to the connection state.

The rectification circuit 172 may rectify wireless power received by the conductive pattern 176 in the DC form and may be implemented, for example, in the form of a bridge diode. The adjustment circuit 173 may convert the rectified power into a preset voltage or current. The adjustment circuit 173 may include a DC/DC converter (not shown). For example, the adjustment circuit 173 may convert the rectified power such that the output end thereof has a voltage of 5 V. Alternatively, a minimum value or a maximum value of the voltage that can be applied may be set in the front end of the adjustment circuit 173.

The switch circuit 174 may connect the adjustment circuit 173 and the battery 175. The switch circuit 174 may be maintained in an on/off state under the control of the control circuit 152.

The battery 175 may be charged by receiving power input from the adjustment circuit 173. According to various embodiments, a charging circuit (charger) (not shown) may be further disposed between the switch circuit 174 and the battery 175, and the charging circuit (not shown) may change a voltage or a current of power received in a predetermined mode (for example, a Constant Current (CC) mode or a Constant Voltage (CV) mode) and charge the battery 175. According to various embodiments, the DC/DC converter of the adjustment circuit 173 may directly charge the battery 175, or the charging circuit (not shown) may adjust the power output from the adjustment circuit 173 once more and charge the battery 175.

The sensing circuit 154 may sense a power state change received by the electronic device 150. Although the sensing circuit 154 is illustrated as a circuit separated from the power-receiving circuit 170 in FIG. 1, at least a part of the sensing circuit 154 may be included within the power-receiving circuit 170. For example, the sensing circuit 154 may periodically or aperiodically measure a current/voltage value received by the conductive pattern 176 through a predetermined current/voltage sensor. The electronic device 150 may calculate an amount of the power received by the electronic device 150 based on the measured current/voltage. According to various embodiments, a part of the sensing circuit 154, for example, the current/voltage sensor, may be included in the power-receiving circuit 170, and another part, for example, the temperature sensor may be disposed outside the power-receiving circuit 170.

According to various embodiments, the power-receiving circuit 170 may further include a sensing circuit for sensing a power state change received by the electronic device 150. For example, the sensing circuit for sensing the power state change may periodically or aperiodically measure a current value or a voltage value received by the coil 176. The control circuit 152 may calculate an amount of power received by the electronic device 150 based on the measured current or voltage.

According to various embodiments, the sensing circuit for sensing the power state change may sense a change in the current or the voltage input into the rectification circuit 172 or output from the rectification circuit 172, may detect a change in the current or the voltage input into an over-voltage protecting circuit (not shown) or output from the over-voltage protecting circuit (not shown), or may further detect a change in the current or the voltage input into the adjustment circuit 173. According to an embodiment, the sensing circuit for sensing the power state change may include a current sensor or a voltage sensor.

According to various embodiments, the electronic device 150 may further include a sensing circuit for sensing a state change of the electronic device 150. For example, the sensing circuit for sensing the state change of the electronic device 150 may periodically or aperiodically sense a temperature change of the electronic device 150. The sensing circuit for sensing the state change of the electronic device 150 may periodically or aperiodically sense movement of the electronic device 150. According to an embodiment, the sensing circuit for sensing the state change of the electronic device 150 may include one of a temperature sensor, a motion sensor, a position measurement sensor, and a combination thereof.

According to various embodiments, the sensing circuit 154 may sense a charging environment change of the electronic device 150. For example, the sensing circuit 154 may periodically or aperiodically measure at least one of an internal temperature and an external temperature of the electronic device 150 through a predetermined temperature sensor.

The display 155 may display overall information related to the charging state of the electronic device 150. For example, the display 155 may display at least one of a total battery capacity of the electronic device 150, a remaining battery charge, a charged amount of battery, a used amount of battery, and an expected charging time. According to various embodiments, the display 155 may display execution screens of various applications executed by the electronic device 150, and may include an input device such as a touch screen.

The communication circuit 160 may communicate with the wireless power transmission device 100 according to a predetermined scheme. The communication circuit 160 may perform data communication with the communication circuit 130 of the wireless power transmission device 100. The communication circuit 160 may operate in a manner similar to or the same as the communication circuit 130 of the wireless power transmission device 100.

The control circuit 152 may transmit, to the wireless power transmission device 100, charging setting information for receiving an amount of required power based on information related to a battery status of the electronic device 150 through the communication circuit 160. For example, when the wireless power transmission device 100 that can transmit wireless power is identified, the control circuit 152 may transmit the charging setting information for receiving the amount of required power to the wireless power transmission device 100 through the communication circuit 160 based on at least one of a total battery capacity of the electronic device 150, a remaining battery charge, the number of times of charging, a used amount of battery charge, a charging mode, a charging scheme, and a wireless reception frequency band.

The control circuit 152 may transmit, to the wireless power transmission device 100, the power amount control information for controlling the amount of power received from the wireless power transmission device 100 according to a change in the amount of power charged in the electronic device 150 through the communication circuit 160. The first communication circuit 161 may include a switch, a capacitor, or a resistor. The control circuit 152 may turn on/off the switch according to a binary code of data to be transmitted based on an on/off keying modulation scheme. Based on impedance sensed by the wireless power transmission device 100, a change in the size of power or the size of current in the power-transmitting circuit 110 may be sensed according to on/off operation of the switch, and may be demodulated to binary code, so that data to be transmitted by the electronic device 150 may be acquired.

The control circuit 152 may transmit the environment information according to the charging environment change of the electronic device 150 to the wireless power transmission device 100. For example, when a temperature data value measured by the sensing circuit 154 is greater than or equal to a preset temperature reference value, the control circuit 152 may transmit the measured temperature data to the wireless power transmission device 100.

Although FIG. 1 illustrates that the wireless power transmission device 100 and the electronic device 150 according to an embodiment of the present disclosure include only the power-transmitting circuit 110 and the power-receiving circuit 170, respectively, each of the wireless power transmission device 100 and the electronic device 150 may include both the power-transmitting circuit 110 and the power-receiving circuit 170. Accordingly, each of the wireless power transmission device 100 and the electronic device 150 according to an embodiment of the present disclosure may perform functions of both the wireless power transmission device 100 and the electronic device 150.

Figure 2A:
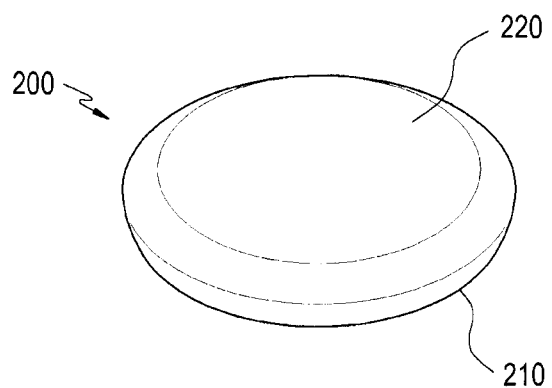
FIG. 2A illustrates a pad mode of the wireless power transmission device according to various embodiments of the present disclosure.
Figure 2B:
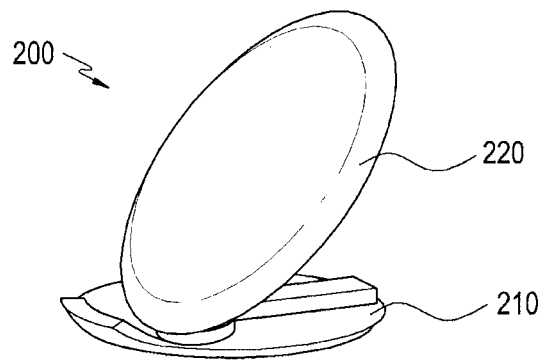
FIG. 2B illustrates a stand mode of the wireless power transmission device according to various embodiments of the present disclosure.

FIGS. 2A and 2B illustrate modes (for example, a pad mode and a stand mode) corresponding to a structural change of the wireless power transmission device according to various embodiments.

FIG. 2A illustrates a pad mode of the wireless power transmission device according to various embodiments of the present disclosure, and FIG. 2B illustrates a stand mode. As illustrated in FIG. 2A, a wireless power transmission device 200 (for example, the wireless power transmission device 100) may include, for example, a housing having a form on which the electronic device can be put. The electronic device may be disposed on the wireless power transmission device 200. At least one of the elements of the wireless power transmission device 100 illustrated in FIG. 1 may be disposed within the housing of the wireless power transmission device 200.

Referring to FIG. 2A, the wireless power transmission device 200 may operate in the pad mode according to various embodiments. The wireless power transmission device 200 may be manufactured in various structures on which the electronic device can be put. For example, the wireless power transmission device 200 may include a first member 210 (a bottom member) in contact with the ground surface during operation and a second member 220 (positioning member) on which the electronic device is positioned.

The second member 220 may include at least one conductive pattern (for example, coil) for transmitting wireless charging power. When the electronic device is positioned on the second member 220, wireless charging may be performed as wireless power is transmitted from the conductive pattern included in the second member 220 to the electronic device.

FIG. 2B illustrates the stand mode of the wireless power transmission device according to various embodiments of the present disclosure. Referring to FIG. 2B, when the second member 220 coupled to the first member 210 moves and stands up from the pad mode of FIG. 2A, the electronic device may be in a position of standing on the second member 220.

According to various embodiments, the second member 220 may rotationally move from the first member 210, or may move to slide slantingly from the first member 210, as illustrated in FIG. 2B. The first member 210 and the second member 220 may be coupled to be separated from each other, or may be coupled to rotate or move without being separated from each other.

Figure 3A:
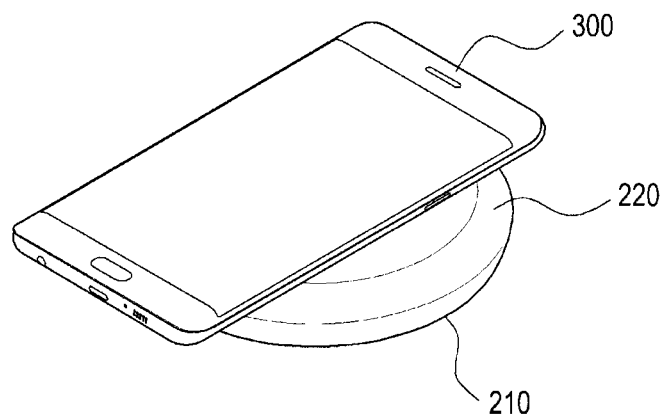
FIG. 3A illustrates the state in which the electronic device is positioned on the wireless power transmission device in the pad mode according to various embodiments of the present disclosure.

FIG. 3A illustrates the state in which the electronic device is positioned on the wireless power transmission device in the pad mode according to various embodiments of the present disclosure. Referring to FIG. 3A, when the wireless power transmission device 200 is in the pad mode as illustrated in FIG. 2A, the electronic device 300 may be positioned on the second member 220 of the wireless power transmission device 200. When wireless power is transmitted to the electronic device 300 from the conductive pattern included within the second member 220, wireless charging may be performed. As can be seen, when the position of the electronic device 300 is lying flat, the wireless power transmission device 200 is in the pad mode.

Figure 3B:
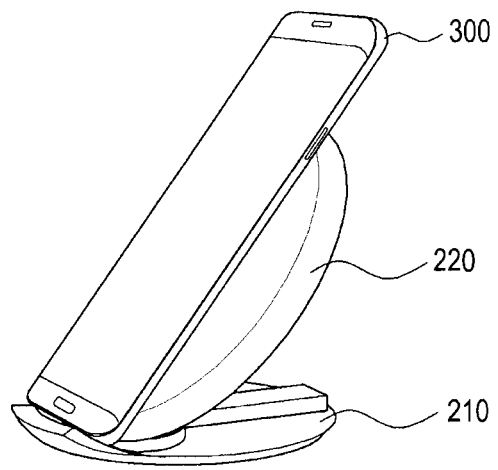
FIG. 3B illustrates the state in which the electronic device is positioned on the wireless power transmission device in a vertical direction in the stand mode according to various embodiments of the present disclosure.
Figure 3C:
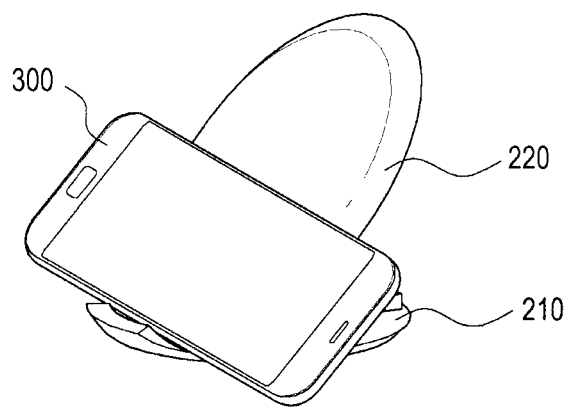
FIG. 3C illustrates the state in which the electronic device is positioned on the wireless power transmission device in a horizontal direction in the stand mode according to various embodiments of the present disclosure.

FIGS. 3B and 3C illustrate states in which the electronic device is positioned on the wireless power transmission device in the stand mode according to various embodiments of the present disclosure. FIG. 3B illustrates the state in which the position of the electronic device 300 is standing on the wireless power transmission device 200 in a vertical orientation according to various embodiments of the present disclosure, and FIG. 3C illustrates the state in which the position of the electronic device 300 is standing on the wireless power transmission device 200 in a horizontal orientation. As can be seen in FIGS. 3B and 3C, when the position of the electronic device 300 is standing, the wireless power transmission device is in the stand mode.

Referring to FIGS. 3B and 3C, when the second member 220 moves from the first member 210 and is oriented in the standing state, the electronic device 300 may be in a position of standing on the second member 220. FIG. 3B illustrates the state in which the electronic device 300 is vertically oriented on the second member 220, and FIG. 3C illustrates the state in which the electronic device 300 is horizontally oriented on the second member 220. Referring to FIGS. 3A, 3B, and 3C, the location of a side of the electronic device 300 that is in contact with the second member 220 may vary depending on the manner in which the electronic device 300 is positioned on the second member 220 of the wireless power transmission device 200. For example, the center part of the electronic device 300 may be located on the center part of the second member 220 of the wireless power transmission device 200 in the pad mode as illustrated in FIG. 3A, the center part of the electronic device 300 may be located on the upper part of the second member 220 of the wireless power transmission device 200 when the electronic device 300 is positioned in the vertical direction in the stand mode as illustrated in FIG. 3B, or the center part of the electronic device 300 may be located on the lower part of the second member 220 of the wireless power transmission device 200 when the electronic device 300 is positioned in the horizontal direction in the stand mode, as illustrated in FIG. 3C.

According to various embodiments, when the electronic device 300 is positioned in different modes or orientations, as illustrated in FIGS. 3A, 3B, and 3C, a predetermined coil may be selected from among the plurality of coils included in the second member 220 according to the position of the electronic device 300, and wireless charging power may be provided to the electronic device 300.

Figure 4A:
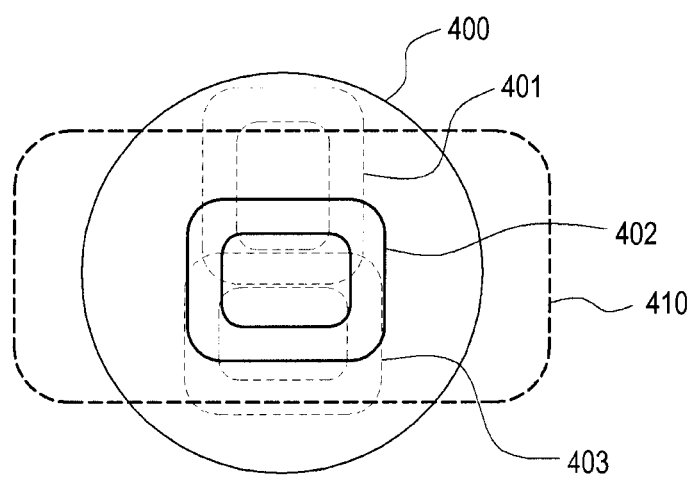
FIG. 4A illustrates a coil selected when the electronic device is positioned in the pad mode according to various embodiments of the present disclosure.
Figure 4B:
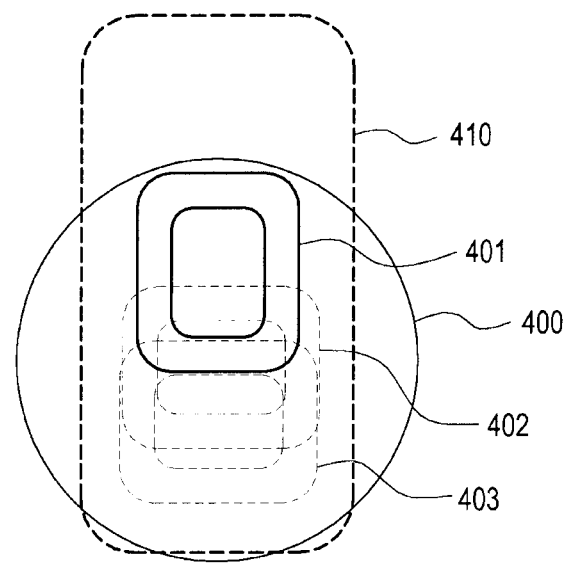
FIG. 4B illustrates a coil selected when the electronic device is positioned in the vertical direction in the stand mode according to various embodiments of the present disclosure.
Figure 4C:
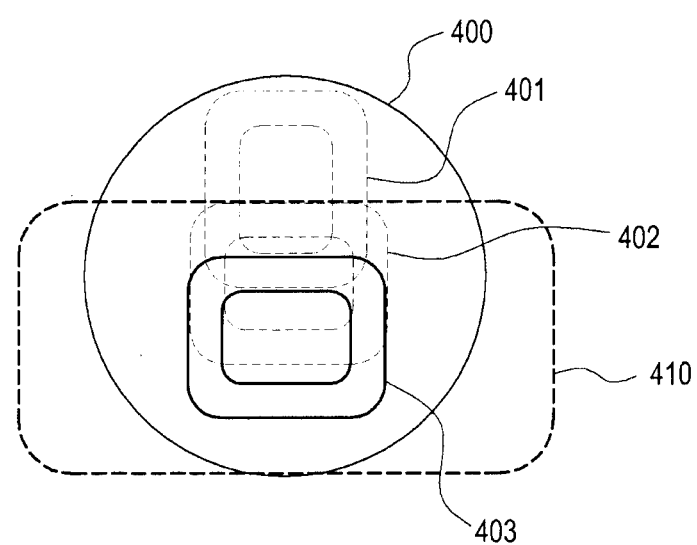
FIG. 4C illustrates a coil selected when the electronic device is positioned in the horizontal direction in the stand mode according to various embodiments of the present disclosure.

FIGS. 4A, 4B, and 4C illustrate, when the wireless power transmission device operates in various modes according to the position type, a coil selected in accordance with the corresponding mode according to various embodiments.

Referring to FIGS. 4A, 4B, and 4C, a plurality of coils may be arranged at different locations within the second member of the wireless power transmission device 400 on which the electronic device 410 is positioned. According to various embodiments, the wireless power transmission device 400 may include, for example, three coils 401, 402, and 403. Each of the coils 401, 402, and 403 may be arranged to expand the degree of freedom of an arranged location of the electronic device 410 or an arranged direction of the electronic device 410.

For example, when the position of the electronic device 410 on the wireless power transmission device 400 is standing in the vertical orientation, the first coil 401 may be arranged on the upper part of the second member so as to be adjacent to the coil for power reception of the electronic device 410. For example, when the position of the electronic device 410 is lying flat on the wireless power transmission device 400 in the pad mode, the second coil 402 may be arranged on the center part of the second member so as to be adjacent to the coil for power reception of the electronic device 410. For example, when the position of the electronic device 410 is standing on the wireless power transmission device 400 (in the stand mode) in the horizontal direction, the third coil 403 may be arranged on the lower part of the second member so as to be adjacent to the coil for power reception of the electronic device 410.

It may be understood by those skilled in the art that setting the locations of the first coil 401, the second coil 402, and the third coil 403 according to the arranged direction of the electronic device 410 and the number of coils within the wireless power transmission device 400 are merely examples. According to various embodiments, when the electronic device 410 is positioned on the wireless power transmission device 400, wireless power may be transmitted through one predetermined coil according to the position type.

FIG. 4A illustrates a coil selected when the position of the electronic device is lying flat on the wireless power transmission device 400 in the pad mode according to various embodiments of the present disclosure. Referring to FIG. 4A, according to various embodiments, when the position of the electronic device 410 is lying flat on the second member in the state in which the wireless power transmission device 400 is in the pad mode, as illustrated in FIG. 3A, the center part of the electronic device 410 may be arranged on the center part of the second member of the wireless power transmission device 400. The wireless power transmission device 400 may determine that the position of the electronic device 410 is lying flat, and may transmit wireless power to the electronic device 410 through the second coil 402 predetermined in accordance with the pad mode.

FIG. 4B illustrates a coil selected when the position of the electronic device is standing in the vertical orientation on the wireless power transmission device 400 in the stand mode according to various embodiments of the present disclosure. Referring to FIG. 4B, according to various embodiments, when the electronic device 410 is standing on the second member in the vertical orientation in the state in which the wireless power transmission device 400 is in the stand mode, as illustrated in FIG. 3B, the center part of the electronic device 410 may be arranged on the second member of the wireless power transmission device 400. The wireless power transmission device 400 in the stand mode, may determine that position of the electronic device 410 is standing in the vertical orientation in the stand mode, select the first coil 401, among the first coil 401 to the third coil 403, predetermined in accordance with the position of the electronic device standing, and transmit wireless power to the electronic device 410. The method of selecting the first coil 401 from among the first coil 401 to the third coil 403 in the state in which it is determined that the wireless power transmission device 400 is in the stand mode may be variously implemented, which will be described below in detail.

FIG. 4C illustrates a coil selected when the position of the electronic device is standing in the horizontal orientation on the wireless power transmission device 400 in the stand mode according to various embodiments of the present disclosure. Referring to FIG. 4C, according to various embodiments, when the position of the electronic device 410 on the second member is standing in the horizontal orientation in the state in which the wireless power transmission device 400 is in the stand mode, as illustrated in FIG. 3C, the center part of the electronic device 410 may be arranged on the lower part of the second member of the wireless power transmission device 400. The wireless power transmission device 400 may determine that the position of the electronic device 410 is standing in the horizontal orientation, select the third coil 403 from among the first coil 401 to the third coil 403, predetermined in accordance with the stand mode, and transmit wireless power to the electronic device 410. The method of selecting the third coil 403 from among the first coil 401 to the third coil 403 in the state in which it is determined that the wireless power transmission device 400 is in the stand mode may be variously implemented, which will be described below in detail.

Figure 5A:
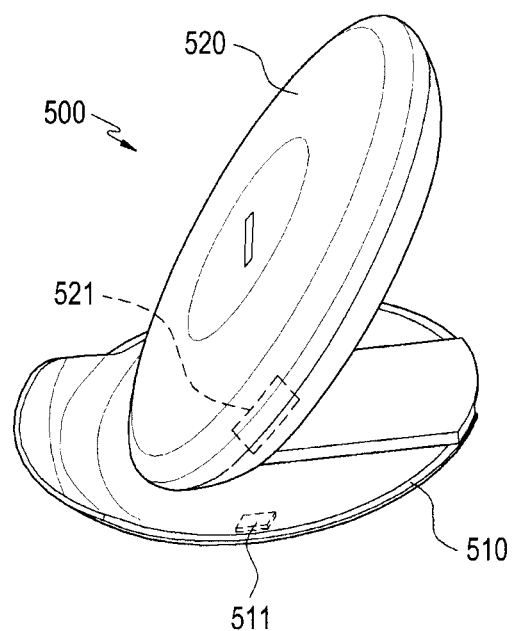
FIG. 5A illustrates the position of a sensor for determining a mode according to various embodiments of the present disclosure.
Figure 5B:
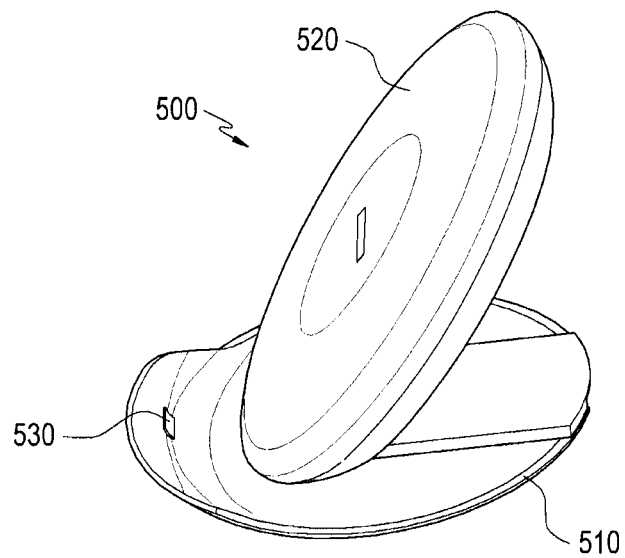
FIG. 5B illustrates the position of a button for determining a mode according to various embodiments of the present disclosure.
Figure 5C:
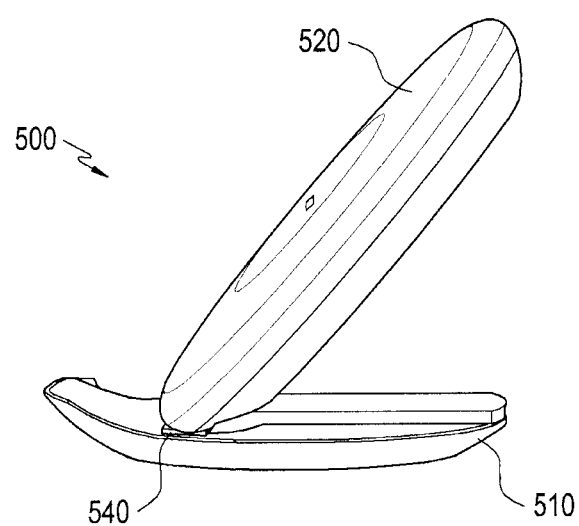
FIG. 5C illustrates the position of a button for determining a mode according to various embodiments of the present disclosure.

FIGS. 5A, 5B, and 5C illustrate various examples of a method of determining a position of the electronic device.

FIG. 5A illustrates the position of a sensor (for example, the sensing circuit 140) for determining a position of an electronic device to be received on second member 520 according to various embodiments of the present disclosure. Referring to FIG. 5A, the wireless power transmission device 500 (for example, the wireless power transmission device 100) may be manufactured in various structures on which the electronic device can be positioned. For example, the wireless power transmission device 500 may include a first member 510 (a bottom member) in contact with a surface and a second member 520 (positioning member) on which the electronic device is positioned.

The second member 520 may include at least one conductive pattern (for example, coil) for transmitting wireless charging power. When the electronic device is positioned on the second member 520, wireless charging may be performed as wireless power is transmitted from the conductive pattern included in the second member 520 to the electronic device.

The second member 520 may be coupled to the first member 510 to move and slantingly slide. When the second member 520 moves and slantingly sides from the first member 510 and stands up as illustrated in FIG. 5A, the wireless power transmission device 500 may operate in the stand mode.

In order to determine the whether the electronic device would be received in a position of standing or lying flat on the wireless power transmission device 500, various methods may be implemented. For example, as illustrated in FIG. 5A, the second member 520 may include a magnet 521 therein, and the first member 510 may include a hall sensor (for example, the sensing circuit 140) therein. When the second member 520 moves from the first member 510 and stands up, the distance between the magnet 521 and the Hall sensor 511 becomes longer. The Hall sensor 511 may sense the distance from the magnet 521 and transmit the sensed distance to the control circuit (for example, the control circuit 120). Thus, an electronic device received by wireless power transmission device 500 would be received in a position of standing. The control circuit 120 may determine whether the wireless power transmission device 500 is in the pad mode or the stand mode based on distance information received from the hall sensor 511. For example, when the strength of a magnetic field sensed by the hall sensor 511 exceeds a preset value, it is determined that the first member 510 and the second member 520 are close to each other, and the control circuit may determine that the wireless power transmission device 500 is in the pad mode. Thus, an electronic device received by the wireless power transmission device 500 would be received in a position of lying flat.

According to various embodiments, the first member 510 may include the magnet therein, and the second member 520 may include the hall sensor therein. The control circuit may select a coil predetermined in accordance with the corresponding mode or determined position of the electronic device from among a plurality of coils based on the signal sensed through the hall sensor.

FIG. 5B illustrates the position of a button for determining a mode according to various embodiments of the present disclosure.

According to various embodiments, the wireless power transmission device (for example, the wireless power transmission device 100) may include a button 530 (for example, the sensing circuit 140) on a part of the first member 510, as illustrated in FIG. 5B. When the electronic device is positioned on the second member 520 in the stand mode of FIG. 5B, the lower part of the electronic device presses the button 530 on the part of the first member 510, and thus the position of standing and the stand mode may be determined. The control circuit (for example, the control circuit 120) may select a coil predetermined in accordance with the corresponding mode from among a plurality of coils based on the signal sensed through the button 530.

FIG. 5C illustrates the position of a button for determining a mode according to various embodiments of the present disclosure.

According to various embodiments, the wireless power transmission device (for example, the wireless power transmission device 100) may include a button 540 on a part of the first member 510 that is in contact with the second member 520 as illustrated in FIG. 5C. When the second member 520 moves from the first member 510 and is oriented in the stand mode, as illustrated in FIG. 5C, the second member 520 presses the button 540 on the first member 510 and it may be determined that the position of a received electronic device is standing and the wireless power transmission device (for example, the control circuit 120) is in the stand mode. The control circuit (for example, the control circuit 120) may select a coil predetermined in accordance with the corresponding mode from among a plurality of coils based on the signal sensed through the button 540.

Examples for sensing the structural change of the wireless power transmission device through various sensors or buttons have been described with reference to FIGS. 5A, 5B, and 5C. Various embodiments of the present disclosure are not limited to the above methods, and the position mode according to a change in the form of the wireless power transmission device may be variously sensed by changing the kind and location of the sensor and installing the sensor at various locations inside or outside the wireless power transmission device. For example, when the wireless power transmission device 500 is in the pad mode, the pad mode may be sensed by forming an electrical contact on a part of the side where the first member 510 and the second member 520 contact each other. According to various embodiments, when the second member 520 rotationally moves from the first member 510 and stands up, the stand mode or the pad mode may be sensed by adding a sensor to a hinge part where the second member 520 and the first member 510 are coupled to each other.

Figure 6A:
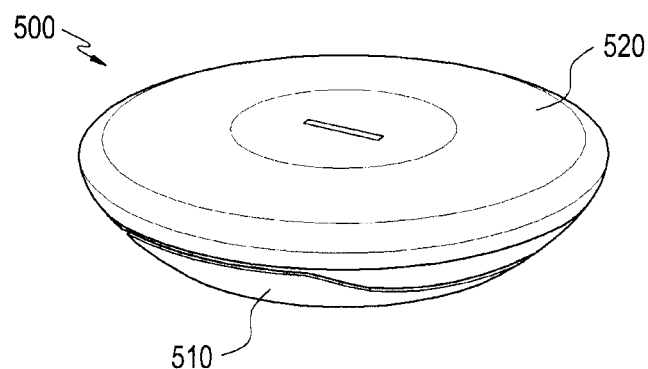
FIG. 6A is a perspective view illustrating the pad mode of the wireless power transmission device according to various embodiments of the present disclosure.
Figure 6B:
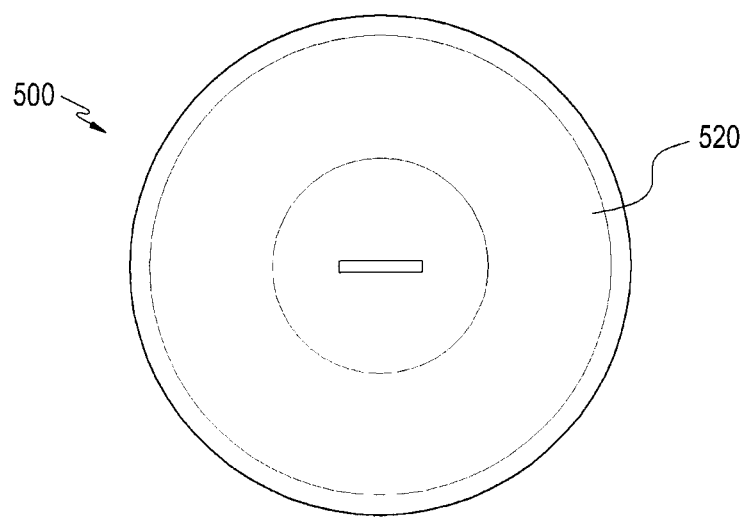
FIG. 6B is a plan view illustrating the pad mode of the wireless power transmission device according to various embodiments of the present disclosure.

FIG. 6A is a perspective view illustrating the pad mode of the wireless power transmission device according to various embodiments of the present disclosure, and FIG. 6B is a plan view illustrating the pad mode of the wireless power transmission device according to various embodiments of the present disclosure. Referring to FIGS. 6A and 6B, the pad mode may be established by moving the second member 520 from the first member 510 in the state in which the wireless power transmission device 500 is in the stand mode, as illustrated in FIGS. 5A, 5B, and 5C. According to various embodiments, switching from the stand mode to the pad mode may be sensed through the above-described method and other methods.

Figure 7:
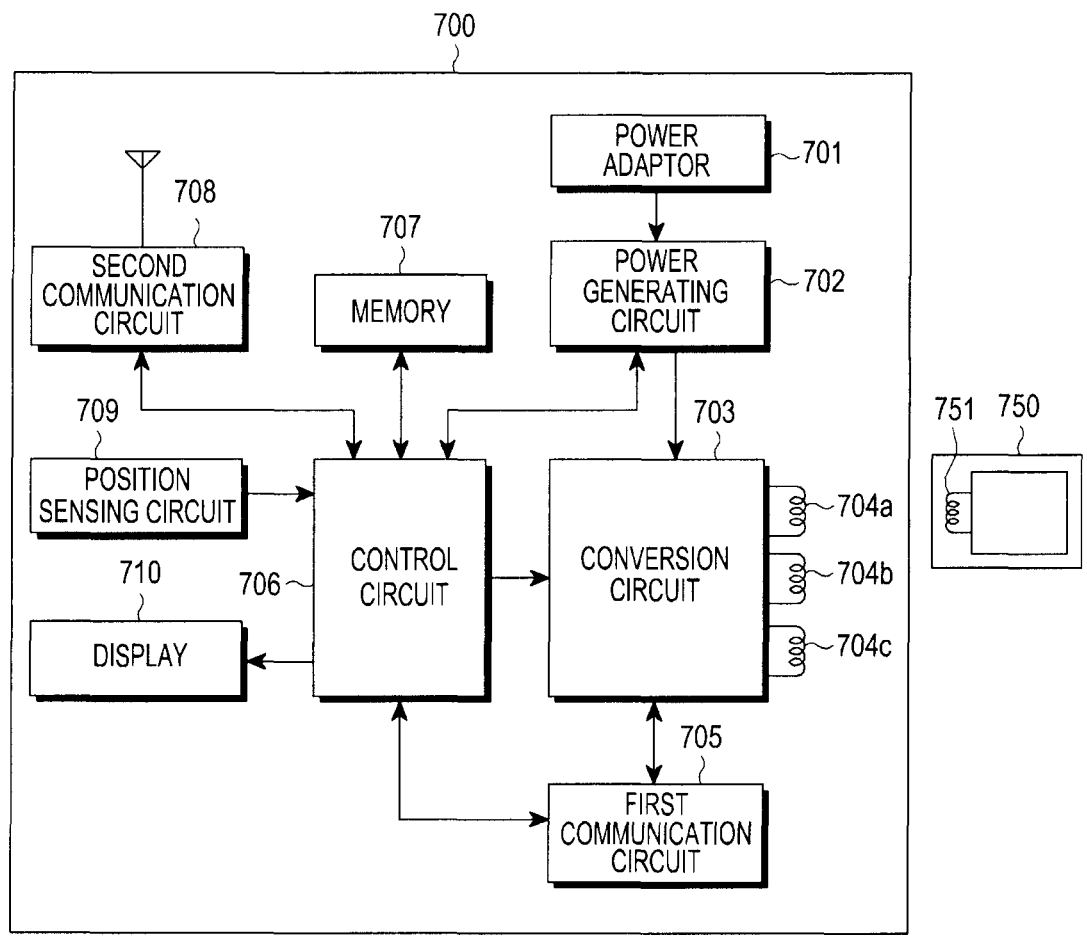
FIG. 7 is a block diagram illustrating the detailed structure of the wireless power transmission device according to various embodiments of the present disclosure.

FIG. 7 is a block diagram illustrating the detailed structure of the wireless power transmission device according to various embodiments of the present disclosure. Referring to FIG. 7, a wireless power transmission device 700 (for example, the wireless power transmission device 100) according to various embodiments of the present disclosure may include at least one of a power adaptor 701, a power-generating circuit 702, a conversion circuit 703, at least one coil 704a, 704b, and 704c, a first communication circuit 705, a control circuit 706, a memory 707, a second communication circuit 708, a position-sensing circuit 709 (for example, the sensing circuit 140), and a display unit 710.

A wireless power reception device (for example, an electronic device 750) that wirelessly receives power may include at least one reception coil 751 and receive wireless power transmitted through at least one transmission coil 704a, 704b, and 704c of the wireless power transmission device 700.

According to various embodiments, at least one block included in the wireless power transmission device 700 of FIG. 7 may correspond to each block included in the wireless power transmission device 100 of FIG. 1.

The conversion circuit 703 may be configured to convert DC power into AC power and wirelessly transmit power to the electronic device 750 through at least one transmission coil 704a, 704b, and 704c. The power adaptor 701 may receive power in the DC or AC waveform from the outside, and the received power may be converted into power in the AC waveform by the conversion circuit 703, and may then be supplied to the electronic device 750. The transmission coils 704a, 704b, and 704c may include a plurality of coils.

The position-sensing circuit 709 may sense a position of the electronic device 750, as illustrated in FIGS. 3A-5C, and may provide the sensed position of the electronic device to the control circuit 706.

According to various embodiments, the control circuit 706 may receive sensed mode information from the position-sensing circuit 709 and determine at least one coil designated from among the plurality of coils 704a, 704b, and 704c in accordance with the mode information as a coil for charging. Information on at least one coil designated in accordance with the mode information may be stored in the memory 707. For example, the first coil 704a and the third coil 704c may be mapped and stored in the stand mode when the position of the electronic device is standing, and the second coil 704b may be mapped and stored in the pad mode when the position of the electronic device is lying flat.

According to various embodiments, when the control circuit 706 identifies the mode information received from the position-sensing circuit 709 and determines the position of the electronic device 750 is lying flat and mode information as the pad mode, a procedure of identifying the electronic device 750 through the second coil 704b designated in accordance with the pad mode and performing communication may be conducted. The procedure in which the wireless power transmission device 700 identifies the electronic device 750 through the second coil 704b and performs communication may be variously implemented depending on the wireless charging scheme.

According to various embodiments, when the wireless power transmission device 700 complies with the standard of an induction scheme, the wireless power transmission device 700 may identify the electronic device 750 by performing digital ping to the electronic device 750 on the second coil 704b. The control circuit 706 may control the conversion circuit 703 to transmit a power signal having a predetermined magnitude at a predetermined operation time point through the second coil 704b. When the wireless power transmission device 700 normally receives a signal strength packet from the electronic device 750, the wireless power transmission device 700 may determine that the electronic device 750 is a device to be normally charged and proceed to an identification and configuration phase.

According to various embodiments, when the wireless power transmission device 700 complies with the standard of a resonance scheme, the wireless power transmission device 700 may identify the electronic device 750 by transmitting a beacon signal (for example, a short beacon signal) to the electronic device 750 from the second coil 704b. The control circuit 706 may control the conversion circuit 703 to transmit a short beacon signal having a predetermined size at a predetermined operation time point through the second coil 704b. The first communication circuit 705 of the wireless power transmission device 700 may determine a load change on the second coil 704b, and when a predetermined condition is met, may transmit a long beacon signal. When the wireless power transmission device 700 normally receives an advertisement signal through the second communication circuit 708, the wireless power transmission device 700 may determine that the electronic device 750 is a device to be normally charged, switch to a low-power mode, and proceed to a wireless charging procedure.

According to various embodiments, when the control circuit 706 identifies the mode information and position of the electronic device received from the position-sensing circuit 709 and determines the mode information as the stand mode and the position of the electronic device is standing, a procedure of identifying the electronic device 750 through the first coil 704a and the third coil 704c designated in accordance with the stand mode and performing communication may be conducted. The procedure in which the wireless power transmission device 700 identifies the electronic device 750 through the first coil 704a and the third coil 704c and performs communication may be variously implemented according to a wireless charging scheme.

According to various embodiments, when the wireless power transmission device 700 complies with the standard of an induction scheme, the wireless power transmission device 700 may identify the electronic device 750 by sequentially performing the digital ping on the electronic device 750 on the first coil 704a and the third coil 704c. The control circuit 706 may control the conversion circuit 703 to transmit a power signal having a predetermined size at a predetermined operation time point through the first coil 704a, and may subsequently transmit a power signal having a predetermined size at a predetermined operation time point through the third coil 704c. When the wireless power transmission device 700 normally receives a signal strength packet from the electronic device 750 at a power signal transmission time point through the first coil 704a, the wireless power transmission device 700 may determine that the position of the electronic device 750 is standing in a vertical orientation, and may perform a wireless charging procedure through the first coil 704a. When the wireless power transmission device 700 normally receives a signal strength packet from the electronic device 750 at a power signal transmission time point through the third coil 704c, the wireless power transmission device 700 may determine that the position of the electronic device 750 is standing in a horizontal orientation and perform a wireless charging procedure through the third coil 704c.

According to various embodiments, when the wireless power transmission device 700 complies with the standard of a resonance scheme, the wireless power transmission device 700 may identify the electronic device 750 by transmitting a beacon signal (for example, a short beacon signal) to the electronic device 750 from the first coil 704a and the third coil 704c. The control circuit 706 may control the conversion circuit 703 to transmit a short beacon signal having a predetermined size at a predetermined operation time point through the first coil 704a or the third coil 704c. The first communication circuit 705 of the wireless power transmission device 700 may determine a load change on the first coil 704a or the third coil 704c, and when a predetermined condition is met, may transmit a long beacon signal. When the wireless power transmission device 700 normally receives an advertisement signal from the electronic device 750 through the second communication circuit 708 at a long beacon signal transmission time point through the first coil 704a, the wireless power transmission device 700 may determine that the electronic device 750 is oriented in a vertical direction, switch to a low-power mode, and perform a wireless charging procedure through the first coil 704a. When the wireless power transmission device 700 normally receives an advertisement signal from the electronic device 750 through the second communication circuit 708 at a long beacon signal transmission time point through the third coil 704c, the wireless power transmission device 700 may determine that the electronic device 750 is positioned in a horizontal direction, switch to a low-power mode, and perform a wireless charging procedure through the third coil 704c.

The power adaptor 701 may receive alternating-current or direct-current power from the outside or a power signal of an embedded battery device, and may output direct-current power having a preset voltage value. The voltage value of the DC power output from the power adaptor 701 may be controlled by the control circuit 706. The DC power output from the power adaptor 701 may be output to the power-generating circuit 702.

The power-generating circuit 702 may convert the DC output from the power adaptor 701 into the AC and output the converted AC. The power-generating circuit 702 may include a predetermined amplifier (not shown). When a DC voltage or a current input through the power adaptor 701 is lower than a preset gain, the amplifier may amplify the DC voltage or the current to a preset value. The power-generating circuit 702 may include a circuit that converts the DC input from the power adaptor 701 into the AC based on a control signal input from the control circuit 706. The power-generating circuit 702 according to various embodiments may include a bridge circuit having a plurality of switches, and at least a part of the power-generating circuit 702 may be implemented within the conversion circuit 703.

The plurality of coils 704a, 704b, and 704c may share at least part of the conversion circuit 703. For example, the conversion circuit 703 may convert the DC to the AC through an inverter. The conversion circuit 703 may include a gate-driving device (not shown). The gate-driving device may convert the DC to the AC while controlling on/off of the DC. Alternatively, the conversion circuit 703 may generate an AC power signal through a wireless power generator (for example, an oscillator).

The control circuit 706 of the wireless power transmission device 700 may be implemented as any of various circuits, such as a general-purpose processor including a CPU, a mini computer, a microprocessor, a Micro Controlling Unit (MCU), and a Field-Programmable Gate Array (FPGA) that may perform calculations, but there is no limitation as to the type thereof.

When the current is applied, the coils 704a, 704b, and 704c may form a magnetic field for inducing or resonating the current to the electronic device 750 according to a wireless charging scheme. The first communication circuit 705 (for example, a resonance circuit) may perform communication (for example, data communication) in an in-band type based on an electromagnetic wave generated by the coils 704a, 704b, and 704c.

The position-sensing circuit 709 may sense whether the electronic device 750 is positioned on the wireless power transmission device 700 while standing (stand mode) or while lying flat (pad mode), and when the electronic device 750 is positioned on the wireless power transmission device 700 while standing, may sense whether the electronic device 750 is positioned in a horizontal orientation or a vertical orientation. According to various embodiments, whether the electronic device 750 is positioned standing in a horizontal orientation or a vertical orientation in the stand mode may be determined based on in-band communication through each coil 704a or 704c.

The control circuit 706 may perform control to wirelessly transmit power to the electronic device 750 through the conversion circuit 703 and the coils 704a, 704b, and 704c. The control circuit 706 may perform control to wirelessly transmit or receive information to or from the electronic device 750 through the first communication circuit 705 or the second communication circuit 708.

According to various embodiments, the received information may include at least one piece of charging setting information related to a battery status of the electronic device 750, power amount control information related to control of the amount of power transmitted to the electronic device 750, environment information related to the charging environment of the electronic device 750, and time information of the electronic device 750

The charging setting information may be information related to a battery status of the electronic device 750 at a wireless charging time point between the wireless power transmission device 700 and the electronic device 750. For example, the charging setting information may include at least one of a total battery capacity of the electronic device 750, a remaining battery charge, the number of times of charging, a used amount of battery, a charging mode, a charging scheme, and a wireless reception frequency band.

The power amount control information may be information for controlling the amount of initially transmitted power according to a change in the amount of power charged in the electronic device 750 during wireless charging between the wireless power transmission device 700 and the electronic device 750.

According to various embodiments, the power amount control information may be information that makes a request for changing a charging mode of the wireless power transmission device 700 according to the environment information and the charging setting information of the electronic device 750. For example, when a temperature measured through a sensing circuit of the electronic device 750 becomes higher than or equal to a particular value, the wireless power transmission device 700 may receive charging setting information to stop transmitting power or to lower the amount of transmitted power from the electronic device 750. According to various embodiments, when the wireless power transmission device 700 identifies the battery-charging status of the electronic device 750 and the battery is fully charged, the wireless power transmission device 700 may receive charging setting information from the electronic device 750 to stop the charging of the electronic device 750. According to various embodiments, the power amount control information may be charging setting information that makes a request for fast wireless charging.

The control circuit 706 may be controlled to generate or transmit power to be transmitted to the electronic device 750 based on the charging setting information among the received information. Alternatively, the control circuit 706 may determine or change the amount of power transmitted to the electronic device 750 based on at least some pieces of the received information (for example, at least one piece of the power amount control information, the environment information, and the time information). Alternatively, the control circuit 706 may control the conversion circuit 703 to change impedance.

The first communication circuit 705 or the second communication circuit 708 may communicate with the electronic device 750 according to a predetermined scheme. The first communication circuit 705 or the second communication circuit 708 may perform data communication with the communication circuit of the electronic device 750. For example, the first communication circuit 705 or the second communication circuit 708 may unicast, multicast, or broadcast the signal.

The first communication circuit 705 may allow the wireless power transmission device 700 to communicate in an in-band type, and the second communication circuit 708 may be implemented as hardware different from the first communication circuit 705 to allow the wireless power transmission device 700 to communicate in an out-of-band type.

According to various embodiments, the first communication circuit 705 may receive a frequency and a signal level of an electromagnetic field signal received through the coils 704a, 704b, and 704c. The control circuit 706 may decode the received frequency and signal level of the electromagnetic field signal and extract information received from the electronic device 750.

According to various embodiments, the first communication circuit 705 may apply, to the coils 704a, 704b, and 704c, a signal for information on the wireless power transmission device 700 to be transmitted to the electronic device 750 or add the signal for information on the wireless power transmission device 700 to an electromagnetic field signal generated through the application of the signal output through the conversion circuit 703 to the coils 704a, 704b, and 704c and transmit the signal to the electronic device 750. The control circuit 706 may change the connection state with at least one of the inductor and the capacitor of the conversion circuit 703 through controlling on/off of the switching device included in the conversion circuit 703 and perform control to output the changed connection state.

According to various embodiments, the second communication circuit 708 may communicate with a communication circuit of the electronic device 750 through Near-Field Communication (NFC), ZigBee communication, infrared communication, visible light communication, Bluetooth communication, Bluetooth Low Energy (BLE) communication, or the like. The communication scheme of the first communication circuit 705 or the second communication circuit 708 is only an example, and embodiments of the present disclosure do not limit the scope thereof to a particular communication scheme performed by the first communication circuit 705 or the second communication circuit 708. The display unit 710 may display overall information related to the charging status of the electronic device 750. For example, the display unit 710 may be implemented as a Light-Emitting Diode (LED), and may display the charging status of the electronic device 750 such that the charging status is divided into a fully charged status or a still-charging status through different colors.

A wireless power transmission device (for example, the wireless power transmission device 100 or 700) according to one of the various embodiments of the present disclosure may include: a plurality of coils; a position-sensing circuit that determines a position of an electronic device charged by the apparatus; and a control circuit that determines at least one coil corresponding to the determined position among the plurality of coils and transmit wireless charging power through one coil selected from the determined at least one coil.

According to various embodiments, the position sensing circuit determines a mode of operation of the apparatus for transmitting wireless power based on the determined position of the electronic device.

According to various embodiments, the mode of operation of the apparatus for transmitting wireless power is a stand mode when the position of the electronic device is standing, and a pad mode when the position of the electronic device is lying flat According to various embodiments of the present disclosure, the position of the electronic device may include at least one of standing and lying flat.

According to various embodiments of the present disclosure, the wireless power transmission device may include a first member; and a second member movably coupled to the first member, and the position-sensing circuit may determine the position of the electronic device based at least in part on sensing movement of the second member with respect to the first member.

According to various embodiments of the present disclosure, the position-sensing circuit may determine the position of the electronic device based at least in part on sensing a magnet included in one of the first member or the second member by a Hall sensor included in the other of the first member or the second member as the second member moves with respect to the first member.

According to various embodiments of the present disclosure, the second member may be coupled to the first member such that the second member slantingly slides and moves from the first member.

According to various embodiments of the present disclosure, the wireless power transmission device further includes a plurality of switches, which are connected in series to respective ones among the plurality of coils, and which are turned on/off by the control circuit.

According to various embodiments of the present disclosure, the wireless power transmission device further include at least one button on the first member or the second member, and the position-sensing circuit may determine the position of the electronic device based at least in part on pressing of the button when the second member moves from the first member.

According to various embodiments of the present disclosure, the wireless power transmission device further include at least one button on the first member or the second member, and the position-sensing circuit may determine the position of the electronic device based at least on pressing of the button by the electronic device as the electronic device is positioned on the apparatus for transmitting wireless power.

According to various embodiments of the present disclosure, the plurality of coils may include: a first coil arranged on an upper part of the second member; a second coil arranged on a center part of the second member; and a third coil arranged on a lower part of the second member, and the control circuit may perform control to transmit wireless charging power through the first coil or the third coil when the position of the electronic device is standing and to transmit wireless charging power through the second coil when the position of the electronic device is lying flat.

According to various embodiments of the present disclosure, the control circuit transmits wireless charging power through the first coil when the electronic device is vertically oriented and to transmit wireless charging power through the third coil when the electronic device is horizontally oriented.

According to various embodiments of the present disclosure, the control circuit may transmit a signal for identifying the electronic device through at least one coil corresponding to the determined mode.

According to various embodiments of the present disclosure, when the number of coils corresponding to the determined modes is plural, the control circuit may sequentially transmit the signal for identifying the electronic device through the plurality of coils and determine a coil that meets a preset condition corresponding to the transmitted signal as a coil for charging the electronic device.

Figure 8A:
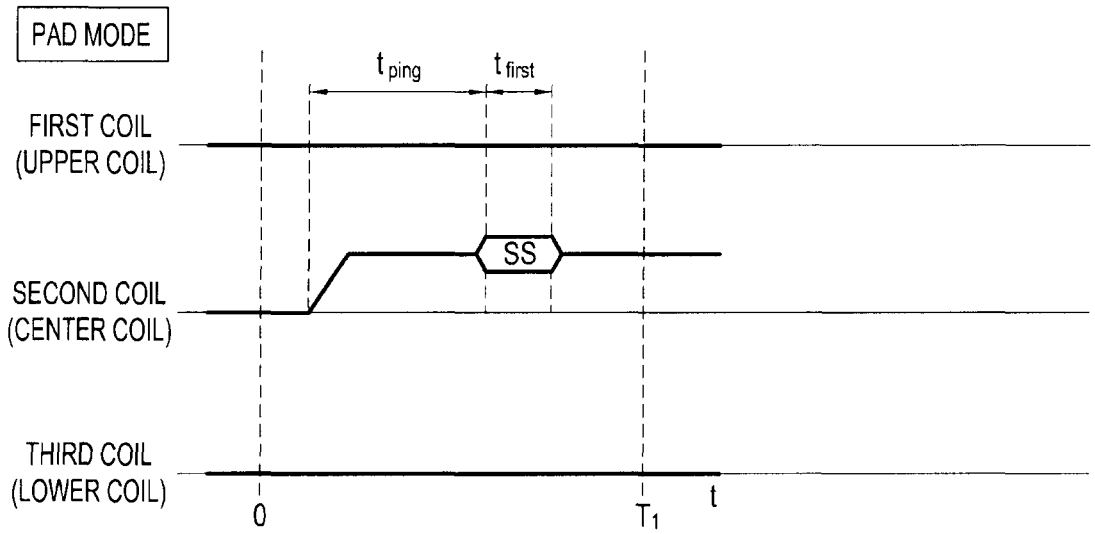
FIG. 8A illustrates the transmission of a signal for identifying the electronic device in the pad mode according to various embodiments of the present disclosure.

FIG. 8A illustrates transmission of a signal for identifying the electronic device in the pad mode according to various embodiments of the present disclosure. Referring to FIG. 8A, when it is determined that the wireless power transmission device (for example, the wireless power transmission device 100 of FIG. 1 or the wireless power transmission device 700 of FIG. 7) is in the pad mode by, for example, the mode-sensing circuit, a digital ping procedure may be performed through a second coil predetermined in accordance with the pad mode. The wireless power transmission device may transmit a power signal having a predetermined magnitude at a predetermined operation time point through the second coil. When the wireless power transmission device detects beginning of a Signal Strength (SS) packet from the electronic device within a $t_{ping}$ time window, the wireless power transmission device may determine that the electronic device is a device to be charged normally, and may proceed to an identification and configuration phase.

Figure 8B:
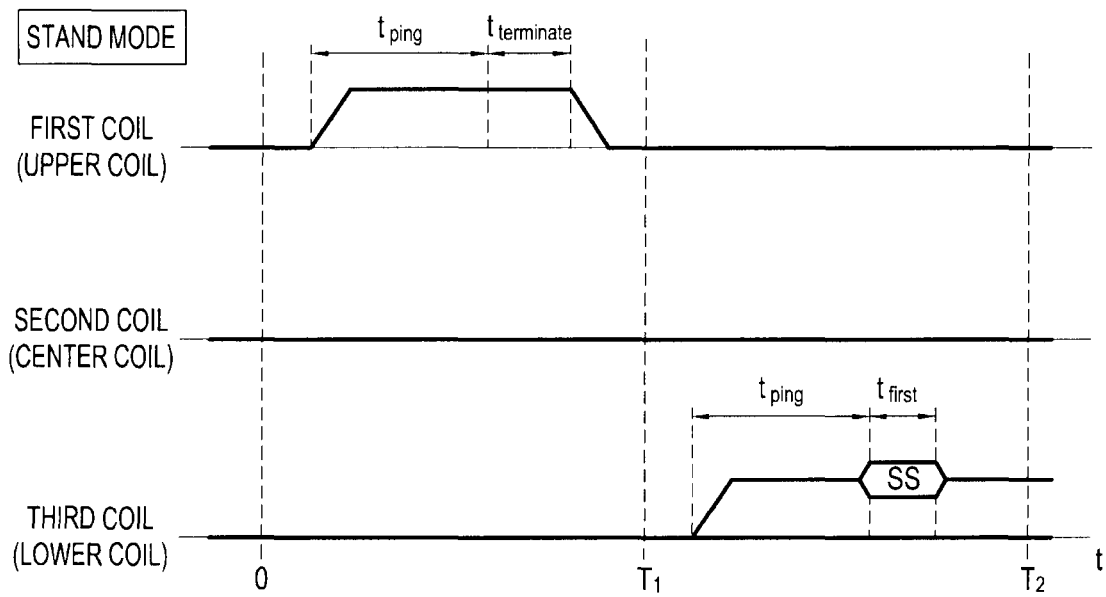
FIG. 8B illustrates the transmission of a signal for identifying the electronic device in the stand mode according to various embodiments of the present disclosure.

FIG. 8B illustrates transmission of a signal for identifying the electronic device in the stand mode according to various embodiments of the present disclosure. Referring to FIG. 8B, when it is determined that the wireless power transmission device (for example, the wireless power transmission device 100 of FIG. 1 or the wireless power transmission device 700 of FIG. 7) is in the stand mode by, for example, the mode-sensing circuit, a digital ping procedure may be performed through a first coil and a third coil predetermined in accordance with the stand mode.

According to various embodiments, the wireless power transmission device may transmit a predetermined amount of power in a power signal at a predetermined operation time point through the first coil. When the wireless power transmission device does not detect the beginning of a Signal Strength (SS) packet from the electronic device within a $t_{ping}$ time window, the wireless power transmission device may perform a digital ping procedure through the third coil in the next signal transmission period without proceeding to the identification and configuration phase through the first coil.

According to various embodiments, the wireless power transmission device may transmit a predetermined amount of power in a power signal at a predetermined operation time point on the next signal transmission period through the third coil. When the wireless power transmission device detects the beginning of a signal Strength (SS) packet from the electronic device within a $t_{ping}$ time window of the next signal transmission period, the wireless power transmission device may determine that the electronic device is oriented in the horizontal direction, determine that the electronic device is a device to be charged normally, and proceed to the identification and configuration phase.

Figure 9:
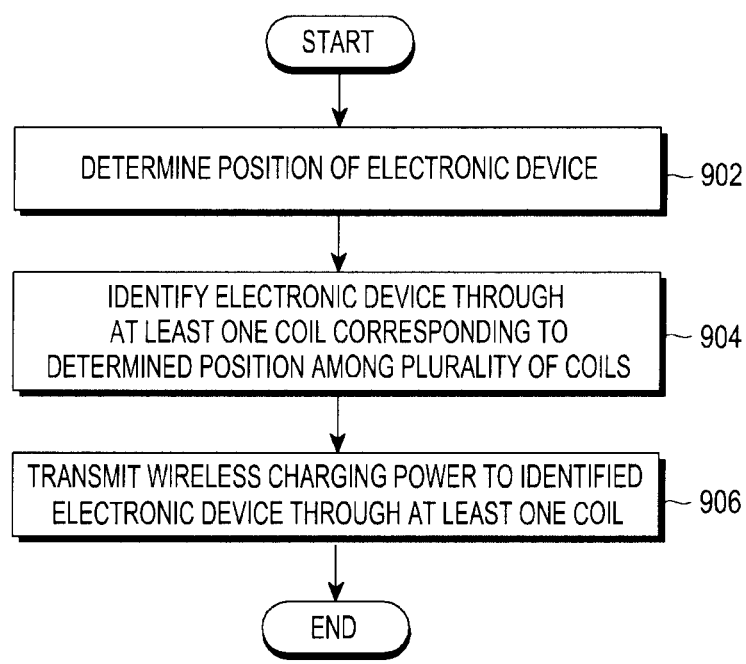
FIG. 9 is a flowchart illustrating a procedure of transmitting wireless charging power according to various embodiments of the present disclosure.

FIG. 9 is a flowchart illustrating a procedure of transmitting wireless charging power according to various embodiments of the present disclosure. Referring to FIG. 9, in operation 902, the wireless power transmission device (for example, the sensing circuit 140 of the wireless power transmission device 100 of FIG. 1 or the position-sensing circuit 709 of the wireless power transmission device 700 of FIG. 7) may determine a position of an electronic device. According to various embodiments, the position may include standing or lying flat.

In operation 904, the wireless power transmission device may identify the electronic device through at least one coil corresponding to the determined position among a plurality of coils. For example, when the wireless power transmission device performs charging through an induction scheme, digital ping may be performed through a coil corresponding to the mode.

In operation 906, the wireless power transmission device may transmit wireless charging power to the identified electronic device through at least one coil.

Figure 10:
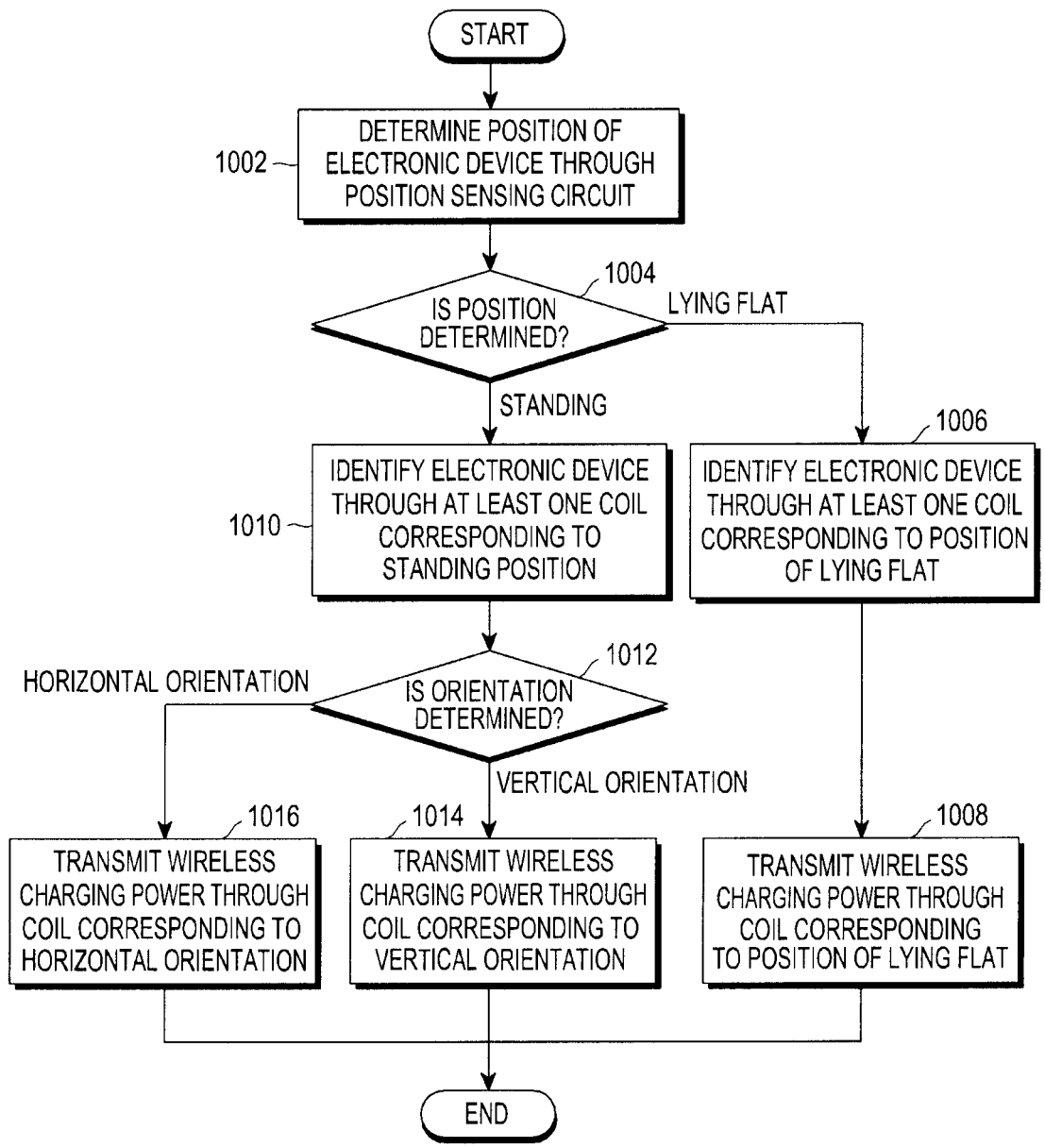
FIG. 10 is a flowchart illustrating a procedure of transmitting wireless charging power based on each mode according to various embodiments of the present disclosure.

FIG. 10 is a flowchart illustrating a procedure of transmitting wireless charging power based on each mode according to various embodiments of the present disclosure. Referring to FIG. 10, in operation 1002, the wireless power transmission device (for example, the wireless power transmission device 100 of FIG. 1 or the wireless power transmission device 700 of FIG. 7) may determine a position of the electronic device through the position-sensing circuit. According to various embodiments, the position may include standing or lying flat.

When the determined position is lying flat in operation 1004, the wireless power transmission device may identify the electronic device through at least one coil corresponding to the pad mode in operation 1006. For example, when the wireless power transmission device performs charging through an induction scheme, digital ping may be performed through a coil corresponding to the position of lying flat.

In operation 1008, the wireless power transmission device may transmit wireless charging power to the identified electronic device through a coil corresponding to the position of lying flat.

When the determined position of the electronic device is standing in operation 1004, the wireless power transmission device may identify the electronic device through a plurality of coils corresponding to the position of standing in operation 1010. For example, when the wireless power transmission device performs charging through the induction scheme, digital ping may be performed through a plurality of coils corresponding to the position of standing.

The wireless power transmission device may determine a position orientation based on a result of the identification in operation 1010. When the determined position direction is the horizontal orientation in operation 1012, the wireless power transmission device may transmit wireless charging power to the identified electronic device through a coil corresponding to the horizontal direction in operation 1016.

When the determined position direction is the vertical direction in operation 1012, the wireless power transmission device may transmit wireless charging power to the identified electronic device through a coil corresponding to the vertical direction in operation 1014.

A wireless power transmission method by a wireless power transmission device (for example, the wireless power transmission device 100 or 700) according to one of the various embodiments of the present disclosure may include an operation of determining a position an electronic device charged by the apparatus, an operation of determining at least one coil corresponding to the determined position of the electronic device among the plurality of coils for charging the electronic device, and an operation of transmitting wireless charging power through one coil selected from the at least one determined coil.

According to various embodiments, an operation can determine a mode of operation of the apparatus based on the determined position of the electronic device.

According to various embodiments, the mode of operation of the apparatus for transmitting wireless power is a stand mode when the position of the electronic device is standing, and a pad mode when the position of the electronic device is lying flat According to various embodiments of the present disclosure, the position includes at least one of standing and lying flat.

According to various embodiments of the present disclosure, the wireless power transmission device may include a first member and a second member movably coupled to the first member, and the position of the electronic device may be determined based at least on sensing of a movement of the second member with respect to the first member.

According to various embodiments of the present disclosure, in the wireless power transmission method, a first coil may be arranged on an upper part of the second member, a second coil may be arranged on a center part of the second member, and a third coil may be arranged on a lower part of the second member, and wireless charging power may be transmitted through the first coil or the third coil when the position of the electronic device is standing and wireless charging power may be transmitted through the second coil when the position of the electronic device is lying flat.

According to various embodiments of the present disclosure, in the wireless power transmission method, wireless charging power may be transmitted through the first coil when the electronic device is vertically positioned and wireless charging power may be transmitted through the third coil when the electronic device is horizontally positioned.

According to various embodiments of the present disclosure, the wireless power transmission method may further include an operation of transmitting a signal for identifying the electronic device through at least one coil corresponding to the determined mode.

According to various embodiments of the present disclosure, the wireless power transmission method may further include an operation of, when the number of coils corresponding to the determined position is plural, sequentially transmitting the signal for identifying the electronic device through the plurality of coils, an operation of determining a coil that meets a preset condition corresponding to the transmitted signal as a coil for charging the electronic device, and an operation of transmitting wireless charging power through the determined coil.

According to various embodiments of the present disclosure, the wireless power transmission method may further include an operation of, when the number of coils corresponding to the determined position is one, transmitting the signal for identifying the electronic device through the coil corresponding to the determined mode, and an operation of, when a preset condition corresponding to the transmitted signal is met, transmitting wireless charging power through the coil corresponding to the determined mode.

According to various embodiments of the present disclosure, the wireless power transmission method may further include an operation of transmitting a signal for identifying the electronic device through one coil selected from the at least one determined coil, an operation of receiving a signal from the electronic device in response to the transmitted signal, and an operation of determining the electronic device as an electronic device to be charged based on the signal received from the electronic device.

Hereinafter, an implementation example of a conversion circuit for determining a coil corresponding to a position type and then transmitting power to the corresponding coil among a plurality of coils will be described with reference to FIGS. 11, 12, 13, 14, and 15.

Figure 11:
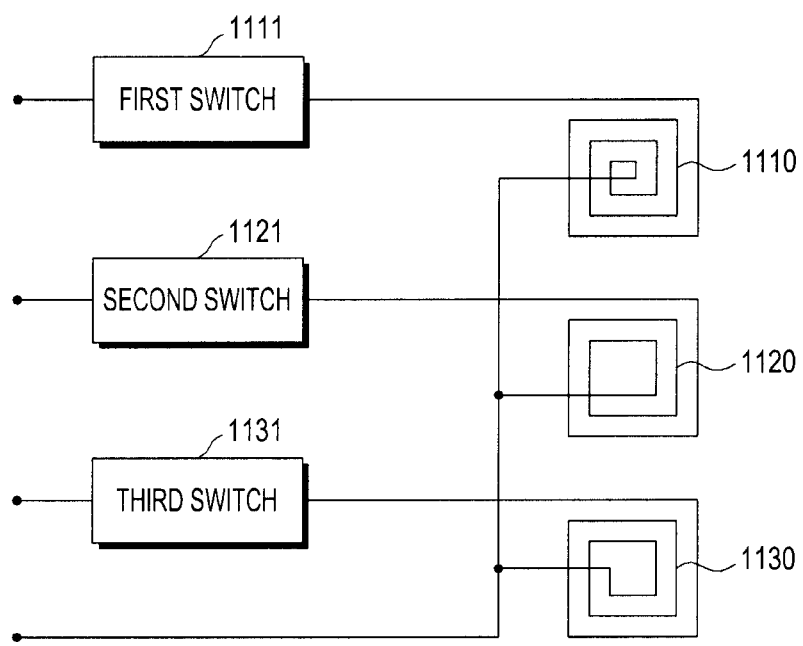
FIG. 11 is a conceptual diagram illustrating circuit arrangement of coils within the wireless power transmission device according to various embodiments of the present disclosure.

FIG. 11 is a conceptual diagram illustrating the circuit arrangement of coils within the wireless power transmission device according to various embodiments of the present disclosure.

As illustrated in FIG. 11, one end of a first coil 1110 may be connected to a first switch 1111, one end of a second coil 1120 may be connected to a second switch 1121, and one end of a third coil 1130 may be connected to a third switch 1131. It may be determined whether to apply the current to each of the first coil 1110, the second coil 1120, and the third coil 1130 according to the on/off state of each of the first switch 1111, the second switch 1121, and the third switch 1131. For example, when the first switch 1111 is controlled to be in the on state, the current may flow in the first coil 1110. Since the current may or may not be applied to each of the plurality of coils 1110, 1120, and 1130 according to the on/off state of each of the first switch 1111, the second switch 1121, and the third switch 1131, the switches 1111, 1121, and 1131 connected to the coils 1110, 1120, and 1130 may be named power application control switches.

The control circuit 706 may select the coil that is the closest to a power reception coil of the electronic device 750 from among the plurality of coils 1110, 1120, and 1130. The control circuit 706 may control the on/off state of each of the first switch 1111, the second switch 1121, and the third switch 1131 such that the current flows only in a selected coil and does not flow in a coil that is not selected. For example, when the first coil 1110 is selected, the control circuit 706 may control the first switch 1111 to be in the on state, and may control the second switch 1121 and the third switch 1131 to be in the off state. Accordingly, although the other ends of the first coil 1110, the second coil 1120, and the third coil 1130 are connected to each other, the current may be applied only to the first coil 1110, and a leakage current may be prevented from flowing in the second coil 1120 and the third coil 1130.

According to various embodiments, the control circuit 706 may simultaneously or sequentially apply an electrical signal corresponding to a ping defined in, for example, a Qi standard scheme to the plurality of coils 1110, 1120, and 1130. The electronic device 750 may communicate in an in-band type through ping. For example, the electronic device 750 may perform on/off keying modulation. The electronic device 750 may perform on/off keying modulation corresponding to information defined in the Qi standard scheme, for example, identification or configuration information. The electronic device 750 may perform on/off keying modulation by controlling a resistor or a capacitor connected to the inside to be connected to or disconnected from a power transmission coil.

The control circuit 706 of the wireless power transmission device 700 may detect a change in magnitude of the current or power flowing in at least one of the plurality of coils 1110, 1120, and 1130. More specifically, as impedance in the electronic device 750 is changed according to on/off keying, the magnitude of the current or voltage flowing in at least one of the plurality of coils 1110, 1120, and 1130 may be changed. The wireless power transmission device 700 may select a coil from which a response signal defined in the Qi standard scheme is sensed. Meanwhile, according to various embodiments of the present disclosure, the wireless power transmission device 700 may select a coil based on a resonance scheme defined in Air Fuel Alliance (AFA). In FIG. 11, it may easily understood by those skilled in the art that there is no limitation as to the number of windings or the direction of windings of the coils 1110, 1120, and 1130.

Figure 12A:
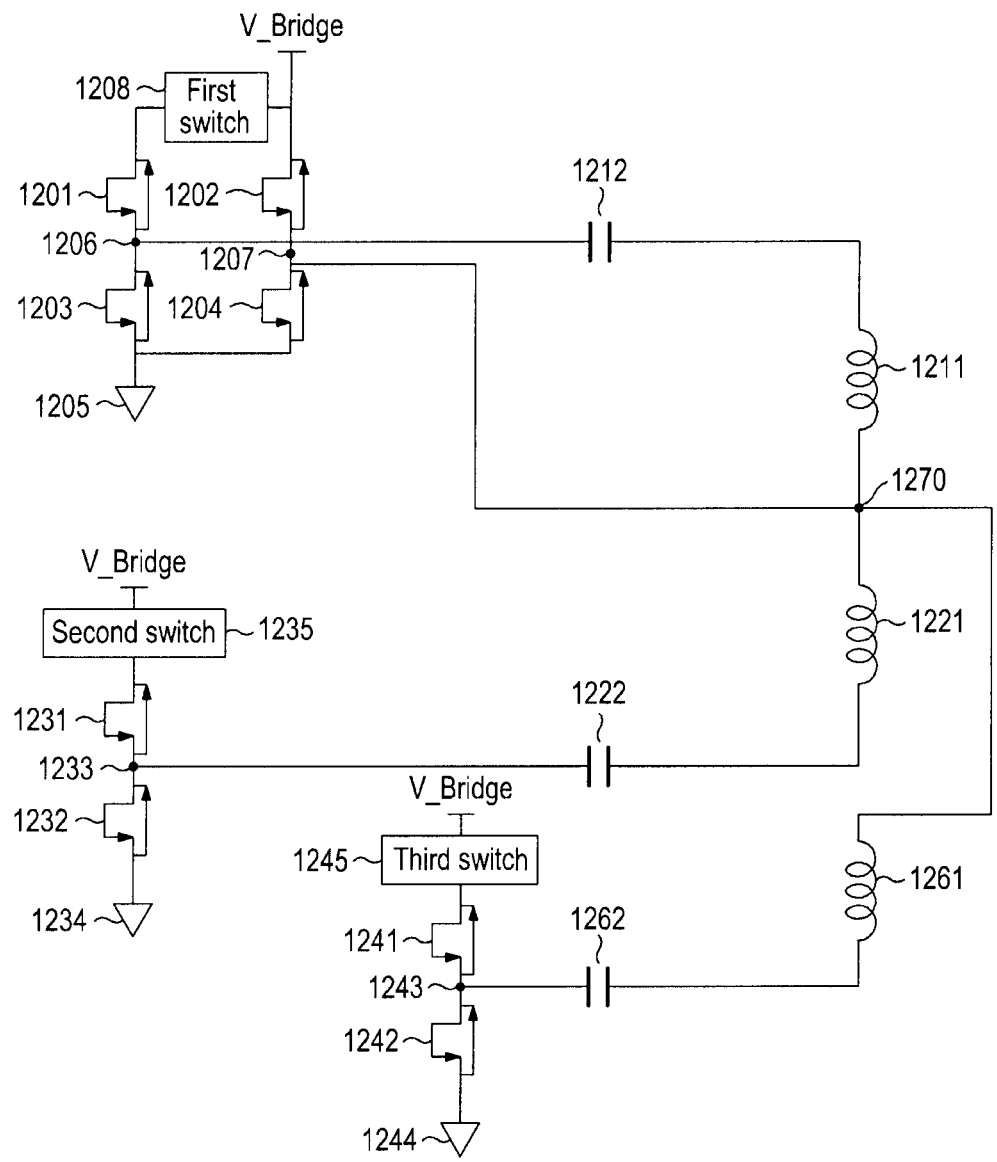
FIG. 12A, FIG. 12B, and FIG. 12C are circuit diagrams for controlling a plurality of coils that share at least some switches for DC-AC conversion according to various embodiments of the present disclosure.
Figure 12B:
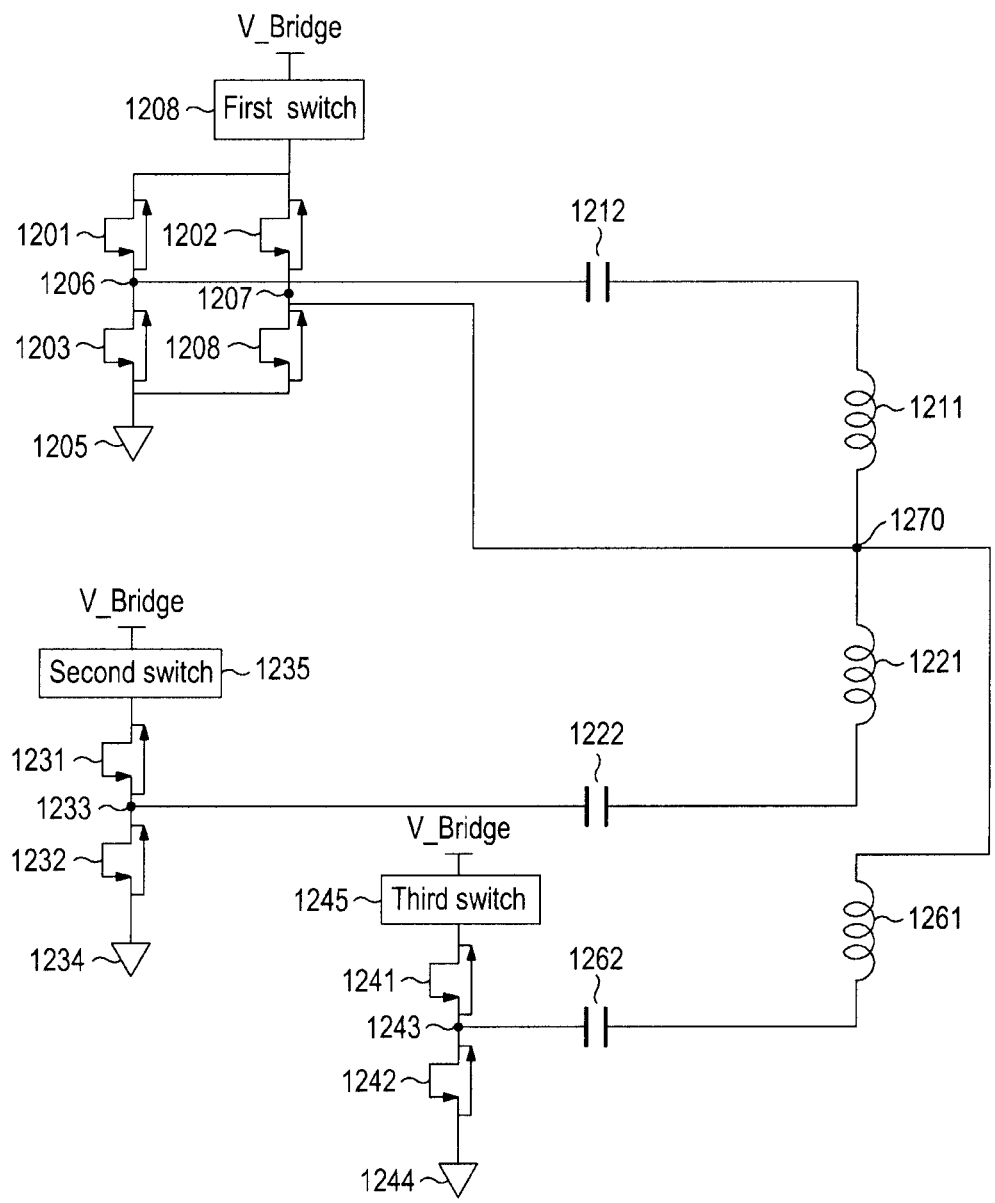
Figure 12C:
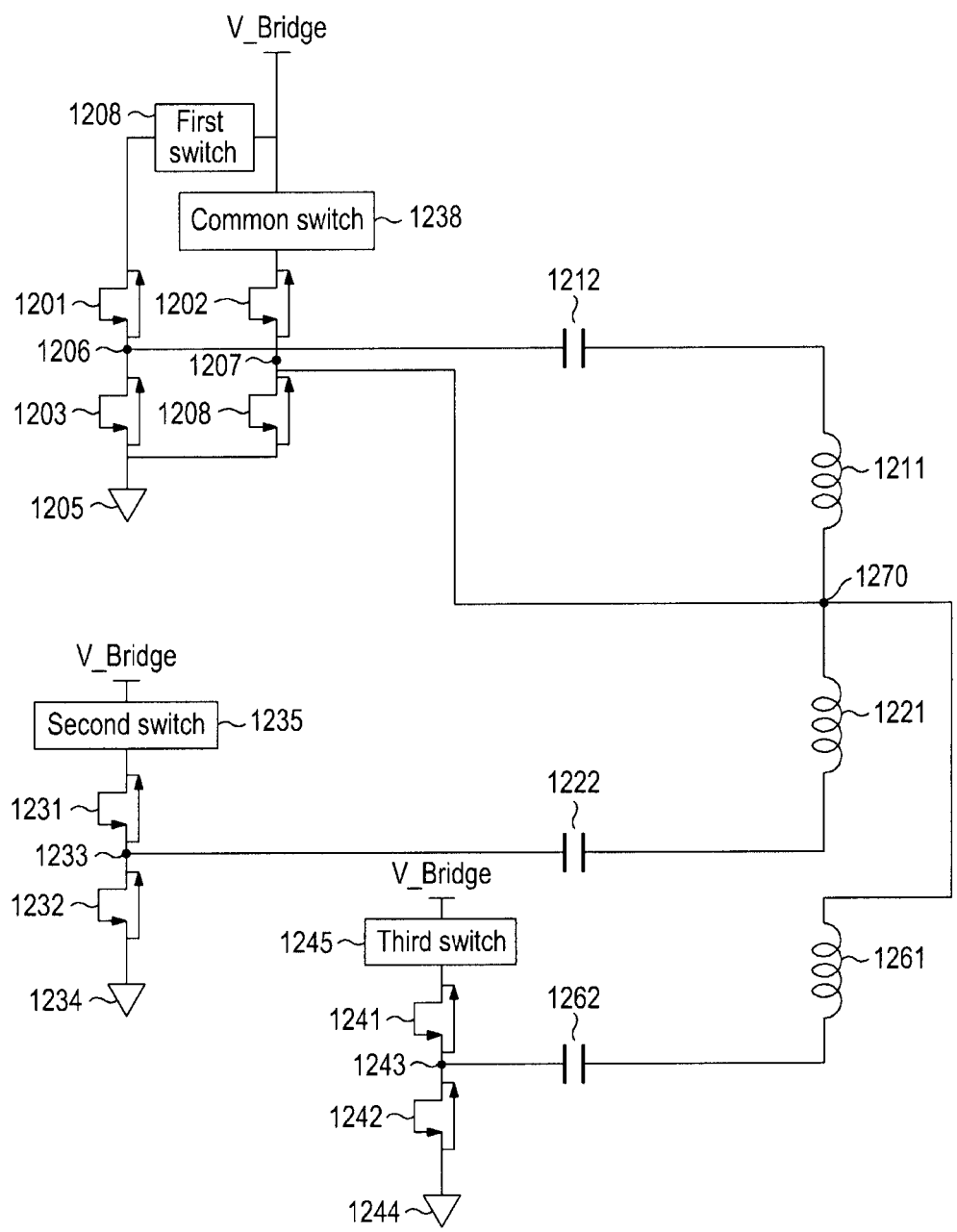

FIGS. 12A, 12B, and 12C are circuit diagrams for controlling a plurality of coils that share at least some switches for DC-AC conversion according to various embodiments of the present disclosure. The wireless power transmission device (for example, the wireless power transmission device 100 of FIG. 1 or the wireless power transmission device 700 of FIG. 7) may determine a position. The wireless power transmission device may select at least one coil in accordance with the mode determined based on the position of the electronic device.

FIG. 12A is a circuit diagram illustrating a plurality of coils that share at least some switches for DC-AC conversion according to various embodiments of the present disclosure. An electrical signal corresponding to a beacon for detecting an object may be simultaneously or sequentially applied to each of at least one predetermined coil (or conductive pattern). The beacon may include at least one of a short beacon for sensing a load change by an object disposed in a charging area defined in the AFA standard and a long beacon used for allowing a communication circuit of the electronic device to transmit a predetermined signal (for example, an advertisement signal in a BLE communication scheme).

It may be determined whether to apply the current to a first coil 1211 according to the on/off state of a first power application control switch 1208. It may be determined whether to apply the current to a second coil 1221 according to the on/off state of a second power application control switch 1235. It may be determined whether to apply the current to a third coil 1261 according to the on/off state of a third power application control switch 1245. A first switch 1208 may selectively connect a power-providing circuit and the first coil 1211, and may be connected to the power-providing circuit and to the first coil 1211. A second switch 1235 may selectively connect the power-providing circuit and the second coil 1221, and may be connected to the power-providing circuit and to the second coil 1221. A third switch 1245 may selectively connect the power-providing circuit and the third coil 1261, and may be connected to the power-providing circuit and to the third coil 1261.

A first conversion switch 1201, a second conversion switch 1203, a first shared conversion switch 1202, and a second shared conversion switch 1204 may be used for converting DC power (V—Bridge) to first AC power and providing the first AC power to the first coil 1211. The first conversion switch 1201, the second conversion switch 1203, the first shared conversion switch 1202, and the second shared conversion switch 1204 may be connected to each other to configure a bridge circuit. Since the DC may be converted into the AC according to control of the on/off state of the first conversion switch 1201, the second conversion switch 1203, the first shared conversion switch 1202, and the second shared conversion switch 1204, the switches may be named conversion switches. Since the second coil 1221 and the third coil 1261 receive the current converted into AC from the first shared conversion switch 1202 and the second shared conversion switch 1204, the switches may be named shared conversion switches. One end of the first coil 1211 may be connected to a common port 1270 and connected to a first node 1207 between the first shared conversion switch 1202 and the second shared conversion switch 1204. The other end of the first coil 1211 may be connected to a second node 1206 between the first conversion switch 1201 and the second conversion switch 1203. A first capacitor 1212 may be connected between the second node 1206 and the first coil 1211, and may configure a resonant circuit having a resonant frequency (for example, ranging from 100 to 205 kHz) defined in the Qi standard scheme together with the first coil 1211. The second conversion switch 1203 and the second shared conversion switch 1204 may be connected to a ground connection 1205.

A third conversion switch 1231, a fourth conversion switch 1232, the first shared conversion switch 1202, and the second shared conversion switch 1204 may configure a bridge circuit. One end of the second coil 1221 may be connected to the common port 1270 and connected to the first node 1207 between the first shared conversion switch 1202 and the second shared conversion switch 1204. The other end of the second coil 1221 may be connected to a third node 1233 between the third conversion switch 1231 and the fourth conversion switch 1232. A second capacitor 1222 may be connected between the third node 1233 and the second coil 1221, and may configure a resonant circuit having a resonant frequency (for example, ranging from 100 to 205 kHz) defined in the Qi standard scheme together with the second coil 1221. The fourth conversion switch 1232 may be connected to the ground connection 1234. The DC may be converted into the AC depending on the on/off state of the third conversion switch 1231, the fourth conversion switch 1232, the first shared conversion switch 1202, and the second shared conversion switch 1204, and the converted AC may be provided to the second coil 1221.

A fifth conversion switch 1241, a sixth conversion switch 1242, the first shared conversion switch 1202, and the second shared conversion switch 1204 may configure a bridge circuit. One end of the third coil 1261 may be connected to the common port 1270 and connected to the first node 1207 between the first shared conversion switch 1202 and the second shared conversion switch 1204. The other end of the third coil 1261 may be connected to a fourth node 1243 between the fifth conversion switch 1241 and the sixth conversion switch 1242. A third capacitor 1262 may be connected between the fourth node 1243 and the third coil 1261, and may configure a resonant circuit having a resonant frequency (for example, ranging from 100 to 205 kHz) defined in the Qi standard scheme together with the third coil 1261. The sixth conversion switch 1242 may be connected to the ground connection 1244. The DC may be converted into the AC according to the on/off state of the fifth conversion switch 1241, the sixth conversion switch 1242, the first shared conversion switch 1202, and the second shared conversion switch 1204, and the converted AC may be provided to the third coil 1261. Accordingly, for DC-AC conversion of the current applied to the third coil s1211, 1221, and 1261, a total of eight switches 1201, 1202, 1203, 1204, 1231, 1232, 1241, and 1242 may be included in the wireless power transmission device 700. Each of the conversion switches 1201, 1202, 1203, 1204, 1231, 1232, 1241, and 1242 may be implemented as, for example, P-MOSFET or N-MOSFET. The power application control switches 1208, 1235, and 1245 may be implemented as, for example, P-MOSFET. It will be easily understood by those skilled in the art that there is no limitation on the type thereof, as long as the conversion switches 1201, 1202, 1203, 1204, 1231, 1232, 1241, and 1242 and the power application control switches 1208, 1235, and 1245 can be controlled to be in the on/off state.

FIG. 12B is a circuit diagram illustrating a plurality of coils that share at least some switches for DC-AC conversion according to various embodiments of the present disclosure.

In the embodiment of FIG. 12B, the arrangement location of the first switch 1208 may be different from that of the embodiment of FIG. 12A. In the embodiment of FIG. 12B, the first switch 1208 may selectively connect the first conversion switch 1201 and DC power (V Bridge) and may connect the DC power (V Bridge) and the first shared conversion switch 1202. In this case, when power is applied to at least one of the first coil 1211, the second coil 1221, and the third coil 1261, the first switch 1208 may be controlled to be in the on state. For example, when power is applied to the second coil 1221, the DC power (V—Bridge) may be converted into AC power by controlling the on/off state of the first shared conversion switch 1202, the second shared conversion switch 1204, the third conversion switch 1231, and the fourth conversion switch 1232, and the converted AC power may be provided to the second coil 1221. In this case, the first switch 1208 and the second switch 1235 may be controlled to be in the on state, and the third switch 1245 may be controlled to be in the off state.

The first switch 1208 may be controlled to be in the off state when power is not applied to any of the first coil 1211, the second coil 1221, and the third coil 1261.

FIG. 12C is a circuit diagram illustrating a plurality of coils that share at least some switches for DC-AC conversion according to various embodiments of the present disclosure.

The embodiment of FIG. 12C may further include a common switch 1238 in comparison with the embodiment of FIG. 12A. The common switch 1238 may selectively connect the DC power (V—Bridge) and the first shared conversion switch 1202, and may be implemented as, for example, P-MOSFET. The common switch 1238 may be controlled to be in the on state when power is applied to at least one of the first coil 1211, the second coil 1221, and the third coil 1261. For example, when power is applied to the second coil 1221, the DC power (V Bridge) may be converted into AC power by controlling the on/off state of the first shared conversion switch 1202, the second shared conversion switch 1204, the third conversion switch 1231, and the fourth conversion switch 1232, and the converted AC power may be provided to the second coil 1221. In this case, the common switch 1238 and the second switch 1235 may be controlled to be in the on state, and the first switch 1208 and the third switch 1245 may be controlled to be in the off state.

The common switch 1238 may be controlled to be in the off state when power is not applied to any of the first coil 1211, the second coil 1221, or the third coil 1261.

Figure 13:
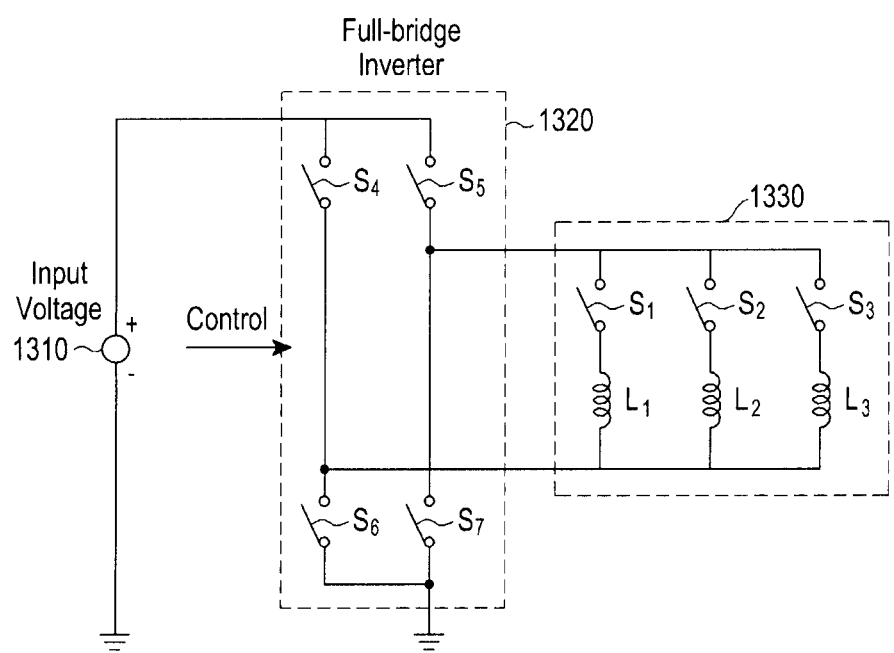
FIG. 13 is a circuit diagram including a plurality of coils according to various embodiments of the present disclosure.

FIG. 13 is a circuit diagram including a plurality of coils according to various embodiments of the present disclosure. A power circuit 1310 may provide power to a full-bridge inverter circuit 1320. The full-bridge inverter circuit 1320 may include a plurality of switches S4, S5, S6, and S7. The control circuit may control the on/off state of the plurality of switches S4, S5, S6, and S7. The full-bridge inverter circuit 1320 may provide AC power to a wireless power-transmitting circuit 1330 under the control of the control circuit. The control circuit may be, for example, the control circuit 120 of FIG. 1 or the control circuit 706 of FIG. 7.

The control circuit may identify a frequency of the AC for power transmission. The control circuit may control the first switch S4 and the fourth switch S7 to be in the on state, and may control the second switch S5 and the third switch S6 to be in the off state during a first period based on the identified frequency of the AC. The control circuit may control the first switch S4 and the fourth switch S7 to be in the off state and control the second switch S5 and the third switch S6 to be in the on state during a second period based on the identified frequency of the AC.

The current or voltage flowing in the wireless power-transmitting circuit 1330 may change over time, and accordingly, AC power may be provided to each coil L1, L2, or L3 included in the wireless power-transmitting circuit 1330. In the wireless power-transmitting circuit 1330, the plurality of coils L1, L2, and L3 may be connected in parallel, and a switch may be connected to each coil in series. For example, a first switch S1 may be connected to the first coil L1, a second switch S2 may be connected to the second coil L2, and a third switch S3 may be connected to the third coil L3 in series.

According to various embodiments, the switch connected to the coil in series may allow power to be transmitted to the coil selected in accordance with a position of the electronic device. For example, when the first coil L1 is selected according to the position type, the control circuit may control the first switch S1 to be in the on state, and may control the second switch S2 and the third switch S3 to be in the off state. When the second coil L2 is selected according to the position type, the control circuit may control the second switch S2 to be in the on state, and may control the first switch S1 and the third switch S3 to be in the off state. When the third coil L3 is selected according to the position type, the control circuit may control the third switch S3 to be in the on state, and may control the first switch S1 and the second switch S2 to be in the off state.

Figure 14:
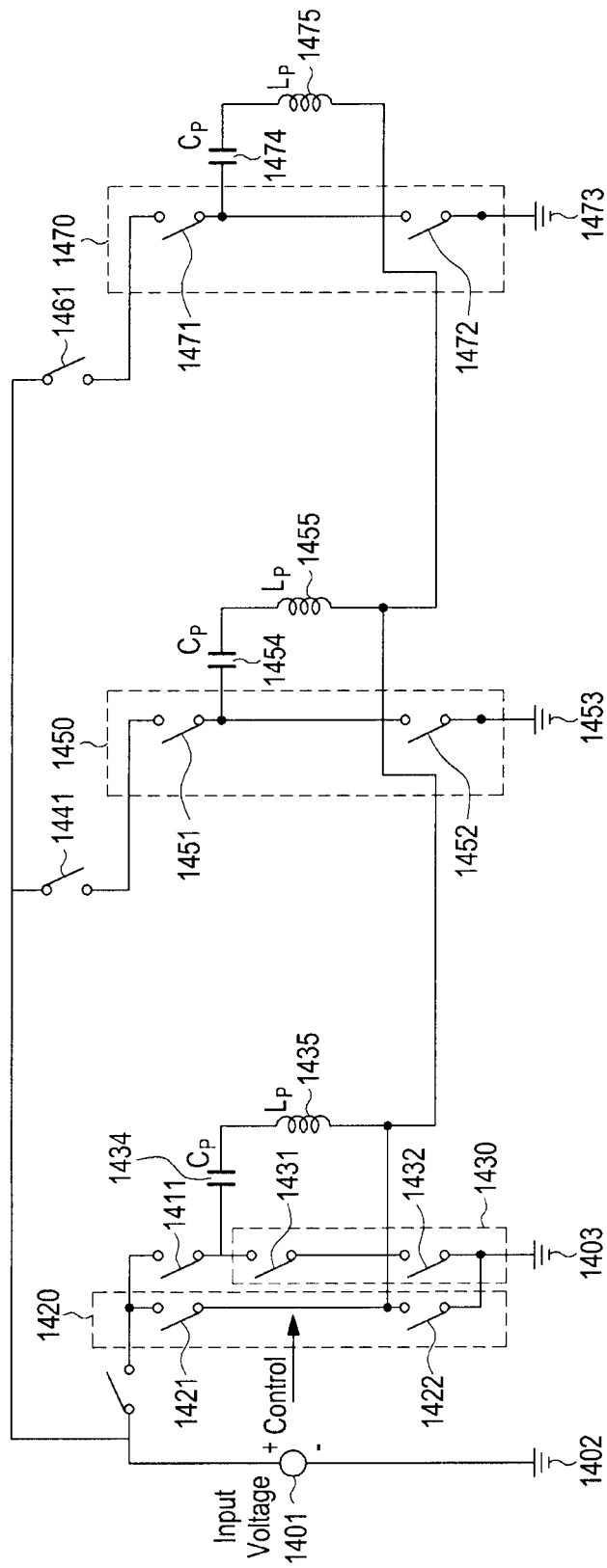
FIG. 14 is a circuit diagram illustrating the wireless power transmission device including three coils according to various embodiments of the present disclosure.

FIG. 14 is a circuit diagram illustrating the wireless power transmission device including three coils according to various embodiments of the present disclosure.

Referring to FIG. 14, a power-providing circuit 1401 may have one end that provides DC power and the other end connected to the ground connection 1402. The DC power from the power-providing circuit 1401 may have an input voltage. The power-providing circuit 1401 may be connected to a first power application control switch 1411, a second power application control switch 1441, and a third power application control switch 1461. Although not illustrated, the control circuit (not shown) may control the on/off state of the first power application control switch 1411, the second power application control switch 1441, and the third power application control switch 1461. For example, when the first power application control switch 1411, the second power application control switch 1441, and the third power application control switch 1461 are implemented as P-MOS-FETs, the control circuit (not shown) may control the on/off state of the first power application control switch 1411, the second power application control switch 1441, and the third power application control switch 1461. For example, the control circuit (not shown) may select a first coil 1435 as a coil for transmitting power. The control circuit (not shown) may control the first power application control switch 1411 connected to the first coil 1435 to be in the on state, and may control the second power application control switch 1441 and the third power application control switch 1461 to be in the off state. The second power application control switch 1441 and the third power application control switch 1461 enter a high-impedance state, and thus leakage current may be prevented from flowing to the second coil 1455 and the third coil 1475.

First multiple switches 1420 may be common conversion switches. The first multiple switches 1420 may be connected to one end of the first coil 1435, one end of the second coil 1455, and one end of the third coil 1475. Second multiple switches 1430 may be conversion switches for the first coil 1435. The second multiple switches 1430 may be connected to the other end of the first coil 1435. A capacitor 1434 for configuring the resonant circuit may be connected between the other end of the first coil 1435 and the second multiple switches 1430. The second multiple switches 1430 may configure a bridge circuit together with the first multiple switches 1420. For example, when the first coil 1435 is selected to provide power, the control circuit (not shown) may control the first shared conversion switch 1421 and the second conversion switch 1432 to be in the on state and control the second shared conversion switch 1422 and the first conversion switch 1431 to be in the off state during a first period. The control circuit (not shown) may control the first shared conversion switch 1421 and the second conversion switch 1432 to be in the off state and control the second shared conversion switch 1422 and the first conversion switch 1431 to be in the on state during a second period. Further, after the second period passes, the control circuit (not shown) may control the first shared conversion switch 1421 and the second conversion switch 1432 to be in the on state and control the second shared conversion switch 1422 and the first conversion switch 1431 to be in the off state. The first period and the second period may actually be the same, and the duration of the first period may be determined depending on the frequency of AC power that is generated. The second shared conversion switch 1422 and the second conversion switch 1432 may be connected to the ground connection 1403.

Third multiple switches 1450 may be connected to the other end of the second coil 1455. The third multiple switches 1450 may be conversion switches for the second coil 1455. The third multiple switches 1450 may be connected to the other end of the second coil 1455. A capacitor 1454 for configuring the resonant circuit may be connected between the other end of the second coil 1455 and the third multiple switches 14540. The third multiple switches 1450 may configure a bridge circuit together with the first multiple switches 1420. The fourth conversion switch 1452 may be connected to the ground connection 1453.

The control circuit (not shown) may control the first shared conversion switch 1421 and the fourth conversion switch 1452 to be in the on state and control the second shared conversion switch 1422 and the third conversion switch 1451 to be in the off state during a first period. The control circuit (not shown) may control the first shared conversion switch 1421 and the fourth conversion switch 1452 to be in the off state and control the second shared conversion switch 1422 and the third conversion switch 1451 to be in the on state during a second period. Accordingly, the first multiple switches 1420 and the third multiple switches 1450 may convert DC power to AC power and provide the converted AC power to the second coil 1455.

Fourth multiple switches 1470 may be connected to the other end of the third coil 1475. The fourth multiple switches 1470 may be conversion switches for the third coil 1475. The fourth multiple switches 1470 may be connected to the other end of the third coil 1475. A capacitor 1474 for configuring the resonant circuit may be connected between the other end of the third coil 1475 and the fourth multiple switches 1470. The fourth multiple switches 1470 may configure a bridge circuit together with the first multiple switches 1420. The sixth conversion switch 1472 may be connected to the ground connection 1473.

The control circuit (not shown) may control the first shared conversion switch 1421 and the sixth conversion switch 1472 to be in the on state and control the second shared conversion switch 1422 and the fifth conversion switch 1471 to be in the off state during a first period. The control circuit (not shown) may control the first shared conversion switch 1421 and the sixth conversion switch 1472 to be in the off state and control the second shared conversion switch 1422 and the fifth conversion switch 1471 to be in the on state during a second period. Accordingly, the first multiple switches 1420 and the fourth multiple switches 1470 may convert DC power to AC power and provide the converted AC power to the third coil 1475.

Although not illustrated, the first power application control switch 1411 may be disposed between the power-providing circuit 1401 and the first shared conversion switch 1421 and between the power-providing circuit 1401 and the first conversion switch 1431 according to various embodiments of the present disclosure. In this case, the first power application control switch 1411 may be controlled to be in the on state when power is applied to at least one of the first coil 1435, the second coil 1455, and the third coil 1475. The first power application control switch 1411 may be controlled to be in the off state when power is not applied to any of the first coil 1435, the second coil 1455, and the third coil 1475.

Alternatively, according to various embodiments of the present disclosure, a shared switch may be further disposed between the power-providing circuit 1401 and the first shared conversion switch 1421. In this case, the shared switch may be controlled to be in the on state when power is applied to at least one of the first coil 1435, the second coil 1455, and the third coil 1475. The shared switch may be controlled to be in the off state when power is not applied to any of the first coil 1435, the second coil 1455, or the third coil 1475.

Figure 15:
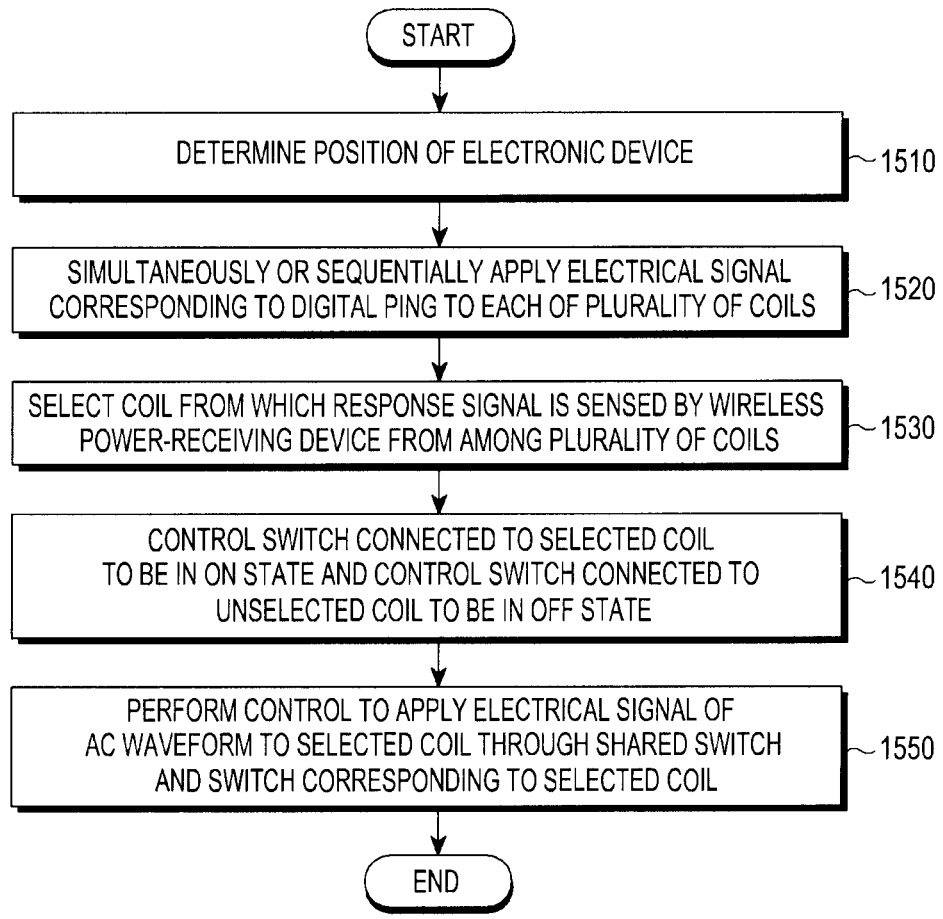
FIG. 15 is a flowchart illustrating a procedure of controlling the control circuit based on the determined mode according to various embodiments of the present disclosure.

FIG. 15 is a flowchart illustrating a procedure of controlling the control circuit based on the determined position of the electronic device according to various embodiments of the present disclosure.

In operation 1510, the wireless power transmission device (for example, the wireless power transmission device 100 of FIG. 1 or the wireless power transmission device 700 of FIG. 7) may determine a position of the electronic device.

In operation 1520, the wireless power transmission device may simultaneously or sequentially apply an electrical signal corresponding to ping to each of at least one coil (or conductive pattern) predetermined in accordance with the mode corresponding to the position type. Here, "ping" may mean the application of a power signal for detecting and identifying a defined power receiver. For example, in a selection state, the wireless power transmission device may determine whether an object exists within a range (sensing area) in which power can be wirelessly transmitted or whether the object is removed. The sensing area may mean an area in which the object within the corresponding area may influence the characteristics of power of the wireless power transmission device, and may be an interface surface of the wireless power transmission device, and may also be a predetermined range in which power can be transmitted in an induction scheme.

According to various embodiments, the wireless power transmission device may sense the electronic device through the ping. In the process of sensing the electronic device to receive wireless power in the selection state, whether the object exists within the predetermined range may be determined by sensing a change in the magnitude of the voltage or current for forming a wireless power signal by a power conversion unit or a coil of the wireless power transmission device instead of receiving the response from the electronic device through a power control message. The wireless power transmission device in the selection state may detect that the object enters or escapes from the sensing area. The wireless power transmission device may attempt to distinguish the wireless power reception device, which can wirelessly receive power, from other objects (for example, keys, coins, and the like) among the objects within the sensing area. When the power transmission device does not receive sufficient information, the power transmission device may repeatedly perform an analog sensing process (analog ping) and then proceed to an identification and configuration phase.

The wireless power transmission device may sense a location of the wireless power reception device (for example, the electronic device) positioned on the interface surface. When the wireless power transmission device includes one or more transmission coils or supports free positioning, the wireless power transmission device may attempt to determine the location of the object. In the sensing state, the wireless power transmission device may perform a method of identifying whether a response to a sensing signal is transmitted from the object through each coil or thereafter identifying whether identification information is transmitted from the object after entrance to the identification state after the identification. The wireless power transmission device may determine a coil to be used for wireless power transmission based on information (the location of the wireless power reception device) acquired through the process. For example, a small amount of current may be supplied through a transmission coil, and the inductance or impedance of the transmission coil may be measured through a detection unit. When the sensing process fails a predetermined number of times, the wireless power transmission device may not enter the sensing state (ping phase) before the object on the interface surface is removed. The wireless power transmission device may sense the object by detecting a change in one or more of a frequency, a current, and a voltage of the power conversion unit due to the object within the sensing area.

In operation 1530, the wireless power transmission device may select a coil from which a response signal is sensed by the wireless power reception device among at least one coil determined in accordance with the position type. In operation 1540, the wireless power transmission device may control a switch connected to the selected coil to be in the on state and a switch connected to a coil that is not selected to be in the off state. The wireless power transmission device may perform a procedure defined in, for example, the Qi standard through the selected coil.

The wireless power transmission device performs a process of sensing the electronic device existing within the sensing area through a power control message. The wireless power transmission device may switch the sensing process in the sensing state (ping phase) to a digital sensing process (digital ping) based on a comparison with a sensing process of the electronic device using a characteristic of a wireless power signal in the selection state. According to various embodiments, the wireless power transmission device may sense the electronic device based on at least one of the analog sensing process (analog ping) and the digital sensing process (digital ping), and may also select a coil on which the electronic device is positioned or a coil to perform charging.

The wireless power transmission device may form a wireless power signal for sensing the electronic device, transmit the wireless power signal to the electronic device, demodulate a wireless power signal modulated by the electronic device, and acquire a power control message corresponding to a response to the sensing signal from the demodulated wireless power signal. The wireless power transmission device may recognize the electronic device to which power is transmitted by receiving the power control message corresponding to the response to the sensing signal. According to various embodiments of the present disclosure, the wireless power transmission device may perform an operation related to the digital ping on all coils and may then select the coil from which the response signal corresponding to the digital ping is detected.

The sensing signal which the wireless power transmission device forms to perform the sensing process may be a wireless power signal formed by applying a power signal of a particular operating point for a predetermined time. The operating point may be a frequency, a duty cycle, or an amplitude of the voltage applied to a transmission coil (Tx coil). The wireless power transmission device may apply the power signal of the particular operating point to generate the generated sensing signal for a predetermined time and transmit the sensing signal to the electronic device.

When responding to the sensing signal, the wireless power reception device may transmit a signal strength packet indicating the strength of the power signal received in response to the sensing signal or a power transmission end packet to the wireless power transmission device. The strength of the power signal within the message may be used as a value indicating the degree of inductive coupling or resonant coupling for power transmission between the wireless power transmission device and the electronic device. For example, when the amount of power received by the wireless power reception device is lower than the amount of power transmitted by the wireless power transmission device, it may be determined that the coupling is low.

The wireless power transmission device may expand the digital sensing process (digital ping) and enter the identification and configuration phase. In order to receive a power control message required for the identification and configuration phase, the wireless power transmission device may maintain the power signal of the particular operating point. On the other hand, when the wireless power transmission device cannot find the electronic device to which power is transmitted (for example, when there is no response to the power signal), the operation state of the wireless power transmission device may return to the selection state. Thereafter, the wireless power transmission device may enter the identification and configuration phase.

The wireless power transmission device in the identification and configuration phase may perform an operation of identifying the selected wireless power reception device and receiving configuration information. To this end, the wireless-power reception device may transmit an identification packet including a message indicating identification information. The identification packet may include version information, a manufacturer's code, and a basic device identifier. The wireless power transmission device may generate a power transfer contract used for power charging with the electronic device based on the identification information and the configuration information.

The power transfer contract may include limits of parameters for determining power transfer characteristics in a power transfer phase. The message transmitted by the wireless power reception device may include information indicating a version of the protocol for wireless power transmission, information for identifying the manufacturer of the electronic device, information indicating whether there is an expansion device identifier, and a basic device identifier. When the information indicating whether or not the expansion device identifier exists indicates that the expansion device identifier exists, an extended identification packet including the expansion device identifier may be transmitted separately. When the expansion device identifier is used, information based on the identification information of the manufacturer, the basic device identifier, and the expansion device identifier may be used to identify the electronic device. In the identification and configuration phase, the electronic device may transmit a configuration packet through the power control message. The configuration packet may include a power class, information on expected maximum power, the number of option configuration packets, an indicator indicating a window size for average reception power, and an indicator indicating a method of determining a current of a main cell of the wireless power transmission device. The wireless power transmission device may simultaneously or sequentially perform at least some of the above-described processes on a plurality of coils, and may select the coil from which the response defined in the standard is detected as a coil to perform charging.

Before entering the power transfer phase, the wireless power transmission device may end the identification and configuration phase to find another electronic device.

In operation 1550, the wireless power transmission device may perform control to apply an electrical signal of an AC waveform to a selected coil through a shared switch and a switch corresponding to the selected coil. A leakage current may be prevented from flowing in coils other than the selected coil.

Figure 16:
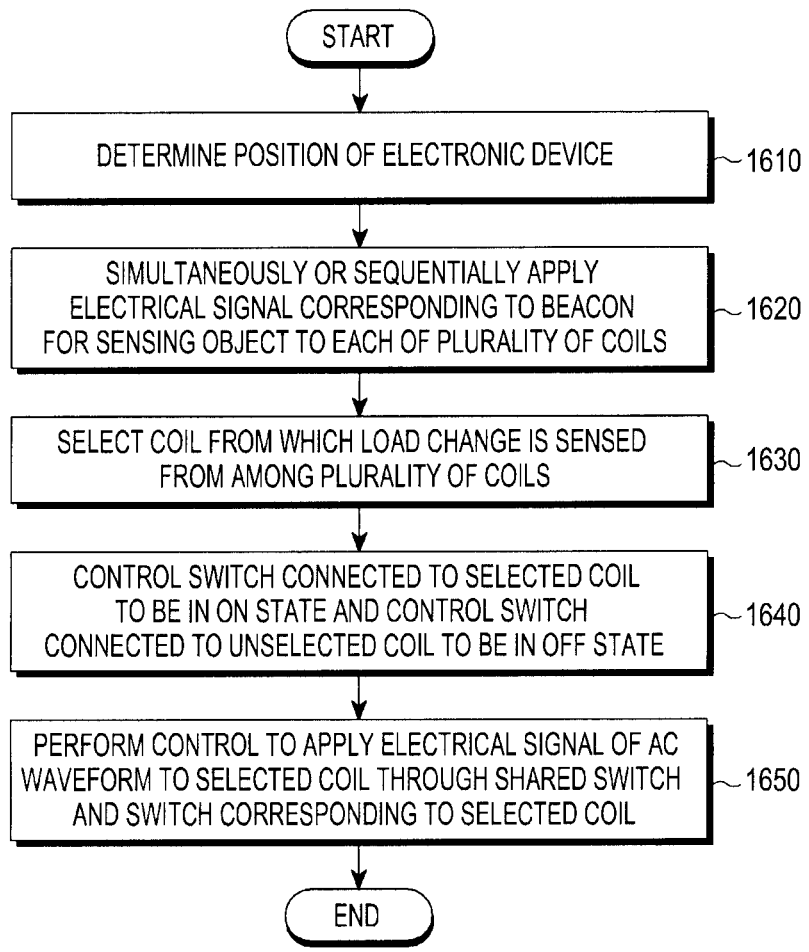
FIG. 16 is a flowchart illustrating a procedure of controlling the control circuit based on the determined mode according to various embodiments of the present disclosure.

FIG. 16 is a flowchart illustrating a procedure of controlling the control circuit based on the determined mode according to various embodiments of the present disclosure.

In operation 1610, the wireless power transmission device (for example, the wireless power transmission device 100 of FIG. 1 or the wireless power transmission device 700 of FIG. 7) may determine a position of an electronic device.

In operation 1620, the wireless power transmission device may simultaneously or sequentially apply an electrical signal corresponding to a beacon for sensing an object to each of at least one coil (or conductive pattern) predetermined in accordance with the determined mode corresponding to a position type. The beacon may include at least one of a short beacon for sensing a load change by an object disposed in a charging area defined in the AFA standard and a long beacon used for allowing a communication circuit of the electronic device to transmit a predetermined signal (for example, an advertisement signal in a BLE communication scheme).

In operation 1630, the wireless power transmission device may select a coil from which a load change is detected among the plurality of coils. In operation 1640, the wireless power transmission device may control a switch connected to the selected coil to be in the on state and control a switch connected to a coil that is not selected to be in the off state. The wireless power transmission device may perform the following operation defined in the AFA standard. For example, the wireless power transmission device may receive an advertisement signal through a communication circuit and perform control to transmit a connection request signal in response to the advertisement signal, so that a BLE connection may be established between the wireless power transmission device and the electronic device. The wireless power transmission device may transmit and receive a PTU static signal and a PRU static signal, and may receive a PRU dynamic signal.

In operation 1650, the wireless power transmission device may perform control to apply the electrical signal of the AC waveform to the selected coil through the shared switch and the switch corresponding to the selected coil. Accordingly, leakage current may be prevented from flowing in the remaining coils that are not selected. The wireless power transmission device may transmit a control signal (PRU control) instructing the start of charging to the electronic device. The electronic device may turn on a switch circuit in response to the reception of the control signal, and accordingly charge a battery. Meanwhile, although not illustrated, a charging circuit (charger) (not shown) may be further disposed between a switch circuit and a battery, and the charger may charge the battery in a predetermined mode (for example, a Constant-Current (CC) mode or a Constant-Voltage (CV) mode.

Figure 17:
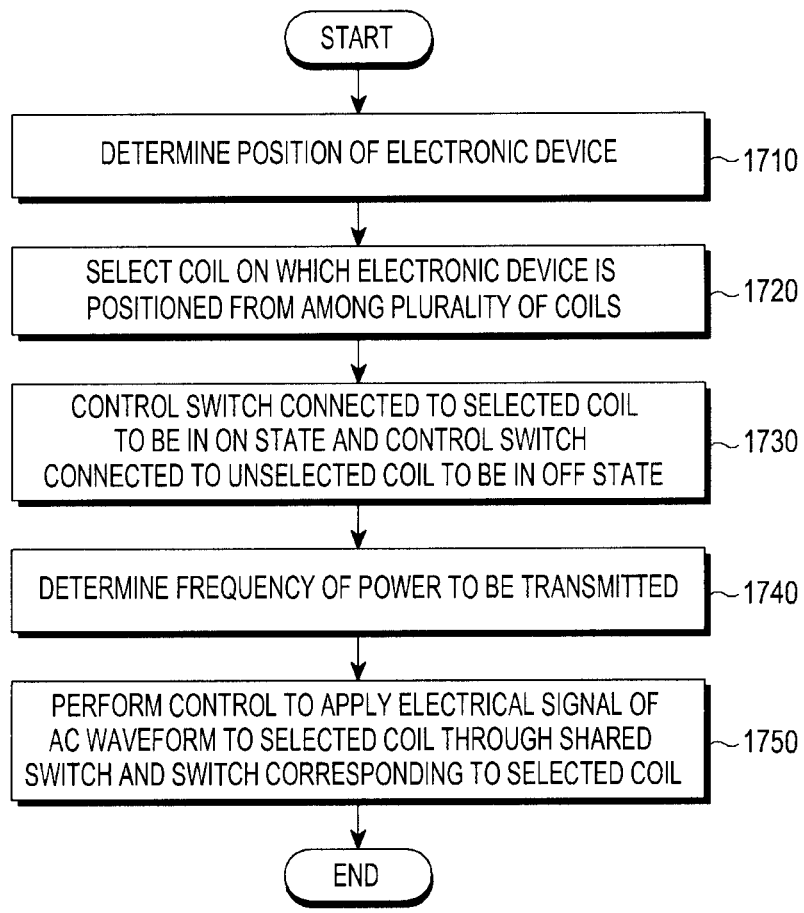
FIG. 17 is a flowchart illustrating a procedure of controlling the control circuit based on the determined mode according to various embodiments of the present disclosure.

FIG. 17 is a flowchart illustrating a procedure of controlling the control circuit based on the determined mode according to various embodiments of the present disclosure.

In operation 1710, the wireless power transmission device (for example, the wireless power transmission device 100 of FIG. 1 or the wireless power transmission device 700 of FIG. 7) may determine a position of an electronic device.

In operation 1720, the wireless power transmission device may select a coil on which the electronic device is positioned from among at least one coil (or conductive pattern) predetermined in accordance with the mode corresponding to the position type. As described above, the wireless power transmission device may select the coil on which the electronic device is positioned according to a method defined in the Qi standard or a method defined in the AFA standard. Alternatively, the wireless power transmission device may include various position-sensing circuits for sensing the physical positions of a hall-sensing circuit at locations corresponding to a plurality of coils, and may select the coil on which the electronic device is positioned based on data from the position-sensing circuit. There is no limitation as to the method by which the wireless power transmission device senses the electronic device, and accordingly it may be easily understood by those skilled in the art that there is no limitation on the method by which the wireless power transmission device selects the coil on which the electronic device is positioned from among the plurality of coils.

In operation 1730, the wireless power transmission device may control a switch connected to the selected coil to be in the on state and may control a switch connected to a coil that is not selected to be in the off state. Accordingly, the wireless power transmission device may prevent a leakage current from flowing in the coils other than the selected coil.

In operation 1740, the wireless power transmission device may determine a frequency of power to be transmitted. For example, an AC frequency for transmitting power defined in the standard according to a charging scheme may be defined, and the wireless power transmission device may determine the corresponding frequency. In operation 1750, the wireless power transmission device may perform control to apply an electrical signal of an AC waveform having the determined frequency to the selected coil through a shared switch and a switch corresponding to the selected coil.

Hereinafter, an implementation example of an electronic device will be described with reference to FIG. 18.

Figure 18:
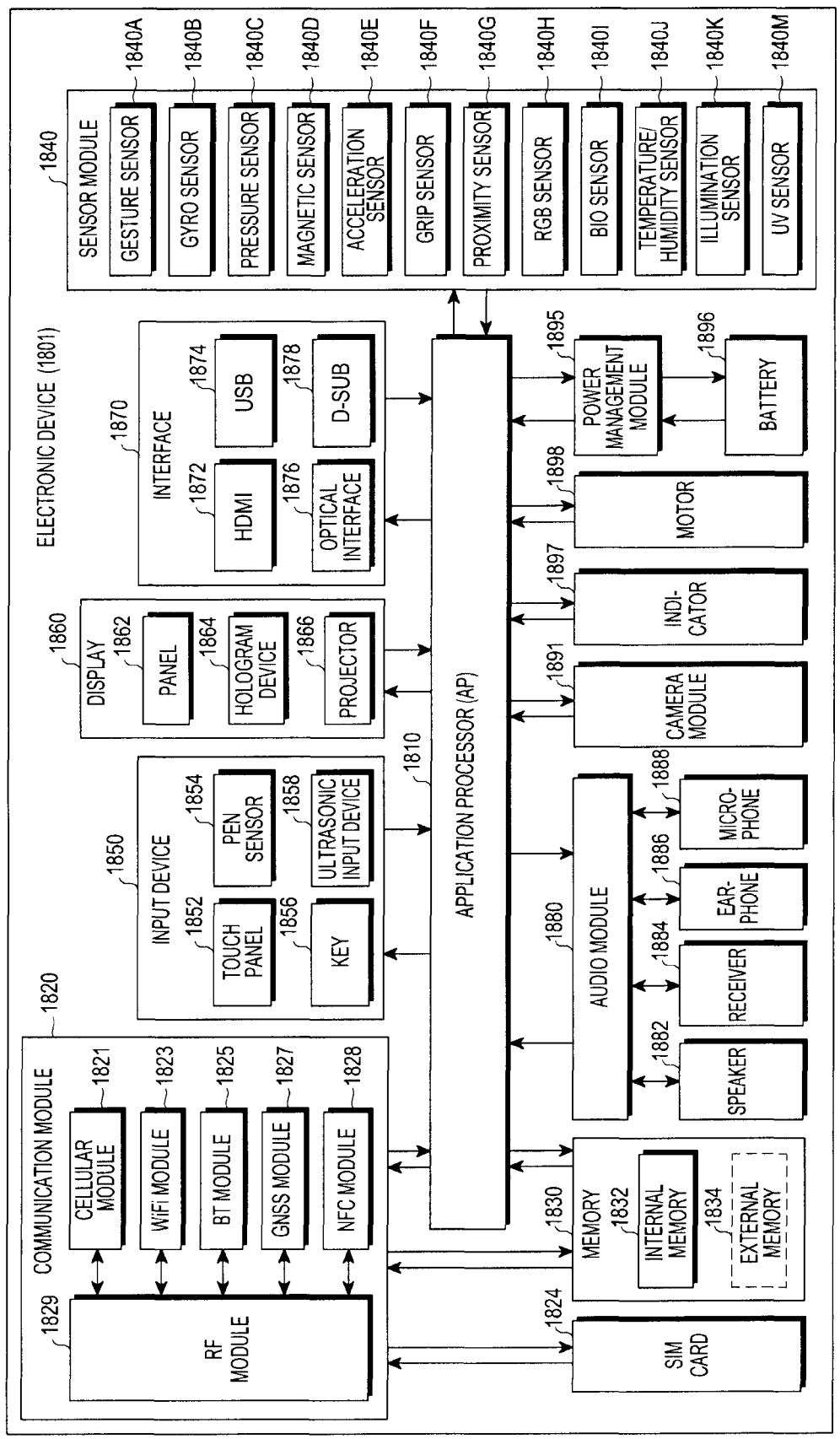
FIG. 18 is a block diagram of a detailed structure of the electronic device according to various embodiments of the present disclosure.

FIG. 18 is a block diagram illustrating an electronic device 1801 (for example, the electronic device 150) according to various embodiments. The electronic device 1801 may include, for example, all or some elements of the electronic device 150 of FIG. 1 or the electronic device 750 of FIG. 7. The electronic device 1801 may include at least one Application Processor (AP) 1810, a communication module 1820, a Subscriber Identification Module (SIM) card 1824, a memory 1830, a sensor module 1840, an input device 1850, a display 1860, an interface 1870, an audio module 1880, a camera module 1891, a power management module 1895, a battery 1896, an indicator 1897, and a motor 1898.

The AP 1810 may control a plurality of hardware or software components connected thereto by driving an operating system or an application program and perform various data processing and calculations. The AP 1810 may be implemented as, for example, a System-on-Chip (SoC). According to an embodiment, the AP 1810 may further include a Graphic Processing Unit (GPU) and/or an image signal processor. The AP 1810 may also include at least some of the elements illustrated in FIG. 18 (for example, a cellular module 1821). The AP 1810 may load commands or data, received from at least one other element (for example, non-volatile memory), in volatile memory to process the loaded commands or data, and may store various types of data in the non-volatile memory.

The communication module 1820 may have a configuration that is the same as or similar to (that of) a communication interface. The communication module 1820 may include, for example, a cellular module 1821, a Wi-Fi module 1823, a BT module 1825, a GPS module 1827, an NFC module 1828, and a Radio Frequency (RF) module 1829.

The cellular module 1821 may provide a voice call, image call, SMS, or Internet service through, for example, a communication network. According to an embodiment, the cellular module 1821 may distinguish between and authenticate electronic devices 1801 within a communication network using a subscriber identification module (for example, the SIM card 1824). According to an embodiment, the cellular module 1821 may perform at least some of functions that the AP 1810 may provide. According to an embodiment, the cellular module 1821 may include a Communication Processor (CP).

Each of the Wi-Fi module 1823, the BT module 1825, the GPS module 1827, and the NFC module 1828 may include, for example, a processor for processing data transmitted/received through the corresponding module. According to some embodiments, at least some (two or more) of the cellular module 1821, the Wi-Fi module 1823, the BT module 1825, the GPS module 1827, and the NFC module 1828 may be included in one Integrated Chip (IC) or IC package.

The RF module 1829 may transmit/receive, for example, a communication signal (for example, an RF signal). The RF module 1829 may include, for example, a transceiver, a Power Amp Module (PAM), a frequency filter, a Low-Noise Amplifier (LNA), or an antenna. According to another embodiment, at least one of the cellular module 1821, the Wi-Fi module 1823, the BT module 1825, the GPS module 1827, and the NFC module 1828 may transmit/receive an RF signal through a separate RF module.

The SIM card 1824 may include, for example, a card including a subscriber identification module and/or an embedded SIM, and may further include unique identification information (for example, an Integrated Circuit Card Identifier (ICCID)) or subscriber information (for example, an International Mobile Subscriber Identity (IMSI)).

The memory 1830 may include, for example, internal memory 1832 or external memory 1834. The internal memory 1832 may include, for example, at least one of volatile memory (for example, dynamic random access memory (DRAM), static RAM (SRAM), synchronous dynamic RAM (SDRAM), or the like) and non-volatile memory (for example, a one-time programmable read only memory (OTPROM), a programmable ROM (PROM), an erasable and programmable ROM (EPROM), an electrically erasable and programmable ROM (EEPROM), a mask ROM, a flash ROM, a flash memory (for example, a NAND flash memory or a NOR flash memory), a hard disc drive, or a solid state drive (SSD)).

The external memory 1834 may further include a flash drive, for example, a Compact Flash (CF), a Secure Digital (SD), a Micro Secure Digital (Micro-SD), a Mini Secure Digital (Mini-SD), an eXtreme Digital (xD), a memory stick, or the like. The external memory 1834 may be functionally and/or physically connected to the electronic device 1801 through any of various interfaces.

The sensor module 1840 may, for example, measure a physical quantity or detect the operating state of the electronic device 1801 and may convert the measured or detected information to an electrical signal. The sensor module 1840 may include, for example, at least one of a gesture sensor 1840A, a gyro sensor 1840B, an atmospheric pressure sensor 1840C, a magnetic sensor 1840D, an acceleration sensor 1840E, a grip sensor 1840F, a proximity sensor 1840G, a color sensor 1840H (for example, a Red, Green, Blue (RGB) sensor), a biometric sensor 1840I, a temperature/humidity sensor 1840J, an illumination sensor 1840K, and an ultraviolet (UV) sensor 1840M. Additionally or alternatively, the sensor module 1840 may include, for example, an E-nose sensor, an electromyography (EMG) sensor, an electroencephalogram (EEG) sensor, an electrocardiogram (ECG) sensor, an infrared (IR) sensor, an iris scanner, and/or a fingerprint sensor. The sensor module 1840 may further include a control circuit for controlling at least one sensor included therein. According to some embodiments, the electronic device 1801 may further include a processor configured to control the sensor module 1840 as a part of or separately from the AP 1810, and may control the sensor module 1840 while the AP 1810 is in a sleep state.

The input device 1850 may include, for example, a touch panel 1852, a (digital) pen sensor 1854, a key 1856, or an ultrasonic input device 1858. The touch panel 1852 may use at least one of, for example, a capacitive type, a resistive type, an infrared type, and an ultrasonic type. The touch panel 1852 may further include a control circuit. The touch panel 1852 may further include a tactile layer and provide a tactile reaction to the user.

The (digital) pen sensor 1854 may be, for example, the part of the touch panel or may include a separate recognition sheet. The key 1856 may include, for example, a physical button, an optical key or a keypad. The ultrasonic input device 1858 may detect an acoustic wave using a microphone (for example, the microphone 1888) of the electronic device 1801 through an input unit that generates an ultrasonic signal to identify data.

The display 1860 (for example, the display 155) may include a panel 1862, a hologram device 1864, or a projector 1866. The panel 1862 may be implemented to be, for example, flexible, transparent, or wearable. The panel 1862 may also be integrated with the touch panel 1852 as a single module. The hologram device 1864 may show a stereoscopic image in the air using light interference. The projector 1866 may project light onto a screen to display an image. For example, the screen may be located inside or outside the electronic device 1801. According to an embodiment, the display 1860 may further include a control circuit for controlling the panel 1862, the hologram device 1864, or the projector 1866.

The interface 1870 may include, for example, a High-Definition Multimedia Interface (HDMI) 1872, a Universal Serial Bus (USB) 1874, an optical interface 1876, or a D-subminiature (D-sub) interface 1878. The interface 1870 may include, for example, a Mobile High-definition Link (MHL) interface, a Secure Digital (SD) card/Multi-Media Card (MMC) interface, or an Infrared Data Association (IrDA) standard interface.

The audio module 1880 may bilaterally convert, for example, sound and an electrical signal. At least some elements of the audio module 1880 may process voice information input or output, for example, through a speaker 1882, a receiver 1884, earphones 1886, the microphone 1888, or the like.

The camera module 1891 is a device which may photograph a still image and a dynamic image. According to an embodiment, the camera module 291 may include one or more image sensors (for example, a front sensor or a back sensor), a lens, an Image Signal Processor (ISP) or a flash (for example, LED or xenon lamp).

The power management module 1895 may manage, for example, power of the electronic device 1801. According to an embodiment, the power management module 1895 may include a Power Management Integrated Circuit (PMIC), a charger Integrated Circuit (IC), or a battery or fuel gauge. The PMIC may use a wired and/or wireless charging method. Examples of the wireless charging method may include a magnetic resonance method, a magnetic induction method, an electromagnetic wave method, and the like. Additional circuits (for example, a coil loop, a resonance circuit, a rectifier, and the like) for wireless charging may be further included. The battery gauge may measure, for example, the remaining battery charge, a charging voltage and current, or a temperature. The battery 1896 may include, for example, a rechargeable battery or a solar battery.

According to various embodiments, the power management module 1895 may include at least some of the elements included in the wireless power transmission device 100 of FIG. 1 or the wireless power transmission device 700 of FIG. 7.

The indicator 1897 may show particular statuses of the electronic device 1801 or a part (for example, AP 1810) of the electronic device 1801, for example, a booting status, a message status, a charging status and the like. The motor 1898 may convert an electrical signal into mechanical vibrations, and may generate a vibration or haptic effect. Although not illustrated, the electronic device 1801 may include a processing device (for example, a GPU) for supporting a mobile TV. The processing unit for supporting the mobile TV may process media data according to a standard of Digital Multimedia Broadcasting (DMB), Digital Video Broadcasting (DVB), media flow or the like.

Each of elements of the wireless power transmission device or electronic device according to the present disclosure may be implemented by one or more components and the name of the corresponding element may vary depending on the type of the wireless power transmission device. In various embodiments, the inspection apparatus may include at least one of the above-described elements. Some of the above-described elements may be omitted from the electronic device, or the inspection apparatus may further include additional elements. Further, some of the components of the electronic device according to the various embodiments of the present disclosure may be combined to form a single entity, and thus, may equivalently execute functions of the corresponding elements prior to the combination.

The term "module" used in the present disclosure may refer to, for example, a unit including one or more combinations of hardware, software, and firmware. The "module" may be interchangeable with a term, such as a unit, a logic, a logical block, a component, or a circuit. The "module" may be the smallest unit of an integrated component or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a programming module form. When the command is executed by one or more processors (for example, the processor 1303), the one or more processors may execute a function corresponding to the command. The computer-readable storage medium may be, for example, the memory included in the apparatus for transmitting wireless power.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Furthermore, some operations may be executed in a different order or may be omitted, or other operations may be added.

According to various embodiments of the present disclosure, a storage medium having instructions stored therein is provided. The instructions may be configured to cause at least one processor to perform at least one operation when executed by the at least one processor. The at least one operation may include an operation of determining a mode corresponding to the position type of an electronic device charged by the apparatus for transmitting wireless power, an operation of determining at least one coil corresponding to the determined mode from among the plurality of coils for charging the electronic device, and an operation of transmitting wireless charging power through one coil selected from the at least one determined coil.

Various embodiments disclosed herein are provided merely to easily describe technical details of the present disclosure and to help the understanding of the present disclosure, and are not intended to limit the scope of the present disclosure. Therefore, it should be construed that all modifications and changes or modified and changed forms based on the technical idea of the present disclosure fall within the scope of the present disclosure.

What is claimed is:

1. An apparatus for transmitting wireless power, the apparatus comprising:
    a plurality of coils;
    a first member;
    a second member movably coupled to the first member;
    a sensing circuit configured to sense movement of the second member with respect to the first member; and
    a control circuit that identifies a mode between a first mode and a second mode based at least in part on the movement of the second member with respect to the first member, and identifies at least one coil corresponding to the identified mode from among the plurality of coils and transmit wireless charging power through one coil selected from the identified at least one coil.

2. The apparatus of claim 1, wherein the identified mode is a mode of operation of the apparatus for transmitting wireless power.

3. The apparatus of claim 2, wherein the mode of operation of the apparatus for transmitting wireless power is a stand mode when the apparatus is standing, and a pad mode when the apparatus is lying flat.

4. The apparatus of claim 1, wherein the sensing circuit is configured to sense a magnet included in one of the first member and the second member by a Hall sensor in the other of the first member and the second member as the second member moves with respect to the first member.

5. The apparatus of claim 1, further comprising a plurality of switches connected to the plurality of coils in series, the plurality of switches turned on/off by the control circuit.

6. The apparatus of claim 1, further comprising at least one button on one of the first member and the second member,
    wherein the sensing circuit senses whether the button is pressed when the second member moves with respect to the first member.

7. The apparatus of claim 1, further comprising at least one button on one of the first member and the second member,
    wherein the sensing circuit senses whether the button is pressed when an electronic device is positioned on the apparatus.

8. The apparatus of claim 1, wherein the plurality of coils comprises:
    a first coil arranged on a first part of the second member;
    a second coil arranged on a second part of the second member; and
    a third coil arranged on a third part of the second member,
    wherein the control circuit transmits wireless charging power through the first coil or the third coil when the identified mode is a standing mode and transmits wireless charging power through the second coil when the identified mode is a lying flat mode.

9. The apparatus of claim 8, wherein, when the identified mode is the standing mode, the control circuit transmits wireless charging power through the first coil when an electronic device is vertically oriented relative to the apparatus and to transmit wireless charging power through the third coil when the electronic device is horizontally oriented.

10. The apparatus of claim 1, wherein the control circuit transmits a signal for identifying an electronic device proximate to the apparatus through the at least one coil corresponding to the identified mode.

11. The apparatus of claim 10, wherein the control circuit sequentially transmits the signal for identifying an electronic device proximate to the apparatus through the plurality of coils and identifies a coil that meets a preset condition corresponding to the transmitted signal as a coil for charging the electronic device.

12. A method of transmitting wireless power by an apparatus for transmitting wireless power, the method comprising:
    identifying a mode between a first mode and second mode based at least in part on movement of a second member of the apparatus with respect to a first member of the apparatus, wherein the second member movably coupled to the first member;
    determining at least one coil corresponding to the identified mode among a plurality of coils for charging an electronic device; and
    transmitting wireless charging power through one coil selected from the determined at least one coil.

13. The method of claim 12,
    wherein the identified mode is a mode of operation of the apparatus for transmitting wireless power.

14. The method of claim 13, wherein the mode of operation of the apparatus for transmitting wireless power is a stand mode when the apparatus is standing, and a pad mode when the apparatus is lying flat.

15. The method of claim 14, wherein a first coil is arranged on a first part of the second member, a second coil is arranged on a second part of the second member, and a third coil is arranged on a third part of the second member, and wireless charging power is transmitted through the first coil or the third coil when the identified mode is the stand mode and wireless charging power is transmitted through the second coil when the identified mode is the pad mode.

16. The method of claim 15, wherein wireless charging power is transmitted through the first coil when the electronic device is vertically oriented and wireless charging power is transmitted through the third coil when the electronic device is horizontally oriented.

17. The method of claim 12, further comprising transmitting a signal for identifying the electronic device through at least one coil corresponding to the identified mode.

18. The method of claim 17, further comprising:
sequentially transmitting the signal for identifying the electronic device through the plurality of coils;
identifying a coil that meets a preset condition corresponding to the transmitted signal as a coil for charging the electronic device; and
transmitting wireless charging power through the identified coil.

19. The method of claim 17, further comprising:
transmitting the signal for identifying the electronic device through a coil corresponding to an identified orientation of the electronic device at the identified mode; and
when a preset condition corresponding to the transmitted signal is met, transmitting wireless charging power through the coil corresponding to the identified orientation of the electronic device at the identified mode.

20. The method of claim 12, further comprising:
transmitting a signal for identifying the electronic device through one coil selected from the at least one coil;
receiving a signal from the electronic device in response to the transmitted signal; and
identifying the electronic device as an electronic device to be charged based on the signal received from the electronic device.

* * * * *